(12) United States Patent
Akebono et al.

(10) Patent No.: US 8,983,703 B2
(45) Date of Patent: Mar. 17, 2015

(54) DEVICE FOR CONTROLLING HYBRID VEHICLE

(75) Inventors: Hiromichi Akebono, Phoenix, AZ (US); Hiroki Matsui, Ebina (JP)

(73) Assignees: Jatco Ltd, Shizuoka (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/130,161

(22) PCT Filed: Jun. 25, 2012

(86) PCT No.: PCT/JP2012/066106
§ 371 (c)(1),
(2), (4) Date: Dec. 30, 2013

(87) PCT Pub. No.: WO2013/005594
PCT Pub. Date: Jan. 10, 2013

(65) Prior Publication Data
US 2014/0142795 A1 May 22, 2014

(30) Foreign Application Priority Data
Jul. 1, 2011 (JP) .................. 2011-147036

(51) Int. Cl.
*B60W 20/00* (2006.01)
*B60W 10/02* (2006.01)
(Continued)

(52) U.S. Cl.
CPC .................. *B60W 20/40* (2013.01); *B60K 6/48* (2013.01); *B60K 6/547* (2013.01); *B60L 11/14* (2013.01);
(Continued)

(58) Field of Classification Search
CPC .......... B60K 6/48; B60K 6/365; B60K 6/547; B60L 11/14; B60L 7/14; B60L 15/2045; B60L 15/2054; B60L 15/2009; B60W 10/02; B60W 10/06; B60W 10/08; B60W 10/10; B60W 10/115; B60W 20/00; B60W 20/30; B60W 20/40; F16H 61/686
USPC ............. 701/22; 180/65.245, 65.267, 65.275, 180/65.28; 903/946, 945, 902, 930; 477/5
See application file for complete search history.

(56) References Cited

U.S. PATENT DOCUMENTS

| 8,491,441 B2 * | 7/2013 | Fukitani | 477/5 |
| 2007/0056784 A1 * | 3/2007 | Joe et al. | 180/65.2 |

(Continued)

FOREIGN PATENT DOCUMENTS

| JP | 2005-231585 A | 9/2005 |
| JP | 2008-025724 A | 2/2008 |

(Continued)

OTHER PUBLICATIONS

U.S. Appl. No. 14/130,152, filed Dec. 30, 2013, Akebono.
(Continued)

*Primary Examiner* — Marthe Marc-Coleman
(74) *Attorney, Agent, or Firm* — Foley & Lardner LLP

(57) ABSTRACT

A control system includes a drive source including an engine and a motor. A clutch is provided between the drive source and a driving wheel, wherein the clutch is engaged when a drive range is selected. The system performs, by a speed control of the motor, a control for keeping an input speed of the clutch at a target speed that is equal to the input speed at start of an engagement control of the clutch. The system judges that the clutch has started to be engaged, in response to a condition that a parameter has exceeded a predetermined threshold value when in a start region of the engagement control of the clutch, wherein the parameter changes along with a rotational fluctuation of the drive source. The system starts the judgment after awaiting satisfaction of a predetermined condition after the start of the engagement control of the clutch.

11 Claims, 9 Drawing Sheets

(51) Int. Cl.

| | | |
|---|---|---|
| *B60W 10/06* | (2006.01) | |
| *B60W 10/08* | (2006.01) | |
| *B60K 6/48* | (2007.10) | |
| *B60K 6/547* | (2007.10) | |
| *B60L 11/14* | (2006.01) | |
| *B60W 10/10* | (2012.01) | |
| *B60W 10/115* | (2012.01) | |
| *F16H 61/02* | (2006.01) | |
| *F16H 61/686* | (2006.01) | |
| *B60L 7/14* | (2006.01) | |
| *B60L 15/20* | (2006.01) | |
| *B60K 6/365* | (2007.10) | |

(52) U.S. Cl.
CPC ............... *B60W 10/02* (2013.01); *B60W 10/06* (2013.01); *B60W 10/08* (2013.01); *B60W 10/10* (2013.01); *B60W 10/115* (2013.01); *B60W 20/00* (2013.01); *F16H 61/02* (2013.01); *F16H 61/686* (2013.01); *B60W 20/30* (2013.01); *B60L 7/14* (2013.01); *B60L 15/2045* (2013.01); *B60L 15/2054* (2013.01); *B60K 6/365* (2013.01); *B60L 15/2009* (2013.01); *B60W 2510/0652* (2013.01); *B60W 2510/0676* (2013.01); *B60W 2510/082* (2013.01); *B60W 2510/107* (2013.01); *B60W 2710/1005* (2013.01); *B60L 2210/40* (2013.01); *B60L 2220/14* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/507* (2013.01); *B60L 2270/145* (2013.01); *Y02T 10/7077* (2013.01); *Y02T 10/7241* (2013.01); *Y02T 10/642* (2013.01); *B60K 2006/4825* (2013.01); *Y02T 10/6221* (2013.01); *Y02T 10/6252* (2013.01); *Y10S 903/902* (2013.01); *B60L 2240/12* (2013.01); *B60L 2240/486* (2013.01); *B60L 2240/80* (2013.01); *B60L 2250/26* (2013.01)
USPC .......................... 701/22; 180/65.28; 903/902

(56) References Cited

U.S. PATENT DOCUMENTS

| | | |
|---|---|---|
| 2012/0115680 A1 | 5/2012 | Hase et al. |
| 2013/0282221 A1 | 10/2013 | Harada et al. |
| 2014/0142795 A1 | 5/2014 | Akebono et al. |

FOREIGN PATENT DOCUMENTS

| | | |
|---|---|---|
| JP | 2009-006781 A | 1/2009 |
| JP | 2009-190584 A | 8/2009 |
| JP | 2010-077981 A | 4/2010 |
| JP | 2010-143296 A | 7/2010 |

OTHER PUBLICATIONS

H. Akebono, U.S. PTO Notice of Allowance, U.S. Appl. No. 14/130,152, dated Oct. 27, 2014, 10 pages.

* cited by examiner

| | B1<br>Fr/B | C1<br>I/C | C2<br>D/C | C3<br>H&LR/C | B2<br>LOW/B | B3<br>2346/B | B4<br>R/B | F1<br>1st OWC | F2<br>1&2 OWC |
|---|---|---|---|---|---|---|---|---|---|
| 1st | (O) | | | (O) | O | | | O | O |
| 2nd | | | | (O) | O | O | | | O |
| 3rd | | | O | | O | O | | | |
| 4th | | | O | O | | O | | | |
| 5th | | O | O | O | | | | | |
| 6th | | O | | O | | O | | | |
| 7th | (O) | O | | O | | | | O | |
| Rev. | O | | | O | | | O | | |

FIG. 14
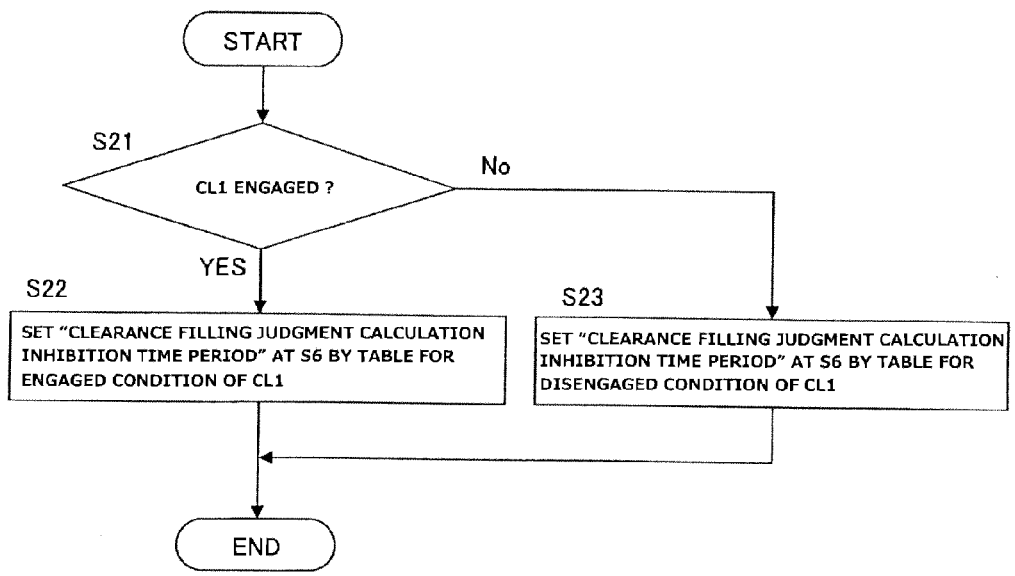
FIG. 15A    FIG. 15B    FIG. 15C
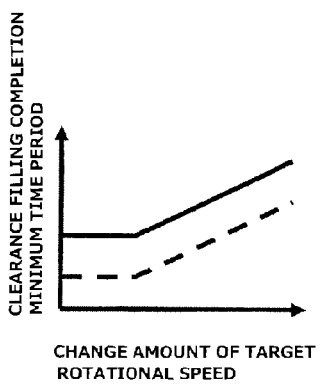 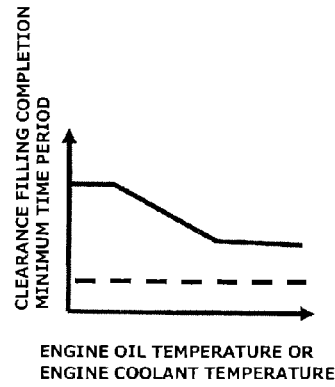 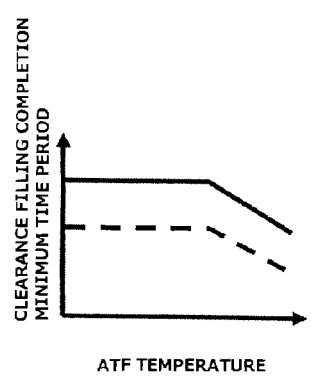
SOLID LINE: CL1 ENGAGED
DOTTED LINE: CL1 DISENGAGED

DEVICE FOR CONTROLLING HYBRID VEHICLE

TECHNICAL FIELD

The present invention relates to a hybrid vehicle control device or apparatus for judging whether a friction engagement element has started to be engaged (namely, whether clearance filling of the friction engagement element has been completed), wherein the friction engagement element is engaged when in a drive range.

BACKGROUND ART

Conventionally, an electric hybrid vehicle control device is known which judges that a second clutch (namely, a starting clutch) of an automatic transmission has started to be engaged, in response to a condition that a load of a motor generator has reached a set load when an N-to-D selecting operation is performed under a condition that a vehicle is stationary (see patent document 1, for example).

PRIOR ART DOCUMENT(S)

Patent Document(s)

Patent Document 1: JP 2009-190584 A

SUMMARY OF THE INVENTION

Problem(s) to be Solved by the Invention

However, the conventional electric hybrid vehicle control device is configured to start engagement start judgment about the second clutch at the time of N-to-D selecting operation. Accordingly, if N-to-D selecting operation is performed when the idle rotational speed of an engine is falling from a high idle rotational speed to a normal idle rotational speed, there may be a trouble that engagement of the second clutch is incorrectly judged to have been started immediately after the N-to-D selecting operation is performed.

For example, if the engine rotational speed continues to be reduced from the high idle rotational speed to the normal idle rotational speed when the vehicle is stationary with the N range selected and the engine in cold state, the load of the motor generator decreases to promote the decrease of the engine rotational speed. When the motor rotational speed control is shifted to a control for keeping a constant target rotational speed in response to N-to-D selecting operation under this condition, the load of the motor generator rapidly increases from the reduced state, causing an incorrect judgment that the increase of the load of the motor generator indicates engagement start of the second clutch.

The present invention is made with attention to the problems described above. It is an object of the present invention to provide a hybrid vehicle control apparatus capable of preventing incorrect judgment of start of engagement of a friction engagement element when a rotational fluctuation of a drive source is caused by an external factor other than engagement start of the friction engagement element.

Means for Solving the Problem(s)

In order to accomplish the object described above, according to the present invention, a hybrid vehicle control apparatus comprises a drive source, a friction engagement element, an input rotational speed keeping control means, and an engagement start judgment means. The drive source includes an engine and a motor. The friction engagement element is provided in a driving force transmission path from the drive source to a driving wheel, wherein the friction engagement element is engaged when a drive range is selected. The input rotational speed keeping control means performs, by a rotational speed control of the motor, a control for keeping an input rotational speed of the friction engagement element at a target rotational speed that is equal to the input rotational speed at start of an engagement control of the friction engagement element. The engagement start judgment means judges, in response to a condition, that the friction engagement element has started to be engaged, wherein the condition is a condition that a parameter has exceeded or become equal to a predetermined threshold value when in a start region of the engagement control of the friction engagement element, wherein the parameter changes along with a rotational fluctuation of the drive source. The engagement start judgment means starts the judgment after awaiting a condition that it becomes possible to judge convergence of a rotational fluctuation of the drive source caused by an external factor other than engagement start of the friction engagement element after the time of start of engagement start control of the friction engagement element.

Effect(s) of the Invention

Accordingly, the judgment is started after awaiting a lapse of an engagement start judgment inhibition time period, wherein the engagement start judgment inhibition time period is defined as a time period from the time of start of engagement start control of the friction engagement element to the time when it becomes possible to judge convergence of a rotational fluctuation of the drive source caused by an external factor other than engagement start of the friction engagement element. Accordingly, the engagement start judgment is suspended until convergence of the rotational fluctuation of the drive source, even if the drive source fluctuates rotationally due to an external factor other than engagement start of the friction engagement element, and the parameter thereby changes significantly. Then, upon convergence of the rotational fluctuation of the drive source due to the external factor other than engagement start of the friction engagement element, the engagement start judgment for the friction engagement element is started. Therefore, if the parameter changes significantly due to the external factor immediately after the start of the engagement control of the friction engagement element, incorrect judgment of engagement start of the friction engagement element is not performed. As a result, it is possible to prevent incorrect judgment of engagement start of the friction engagement element, when the drive source fluctuates rotationally due to an external factor other than engagement start of the friction engagement element.

BRIEF DESCRIPTION OF THE DRAWINGS

FIG. 14 is a flow chart showing a flow of setting a clearance filling judgment calculation inhibition time period (clearance filling completion minimum time period) according to a second embodiment.

FIG. 15 is an illustration diagram showing an example of table for setting the clearance filling completion minimum time period.

MODE(S) FOR CARRYING OUT THE INVENTION

Figure 1:
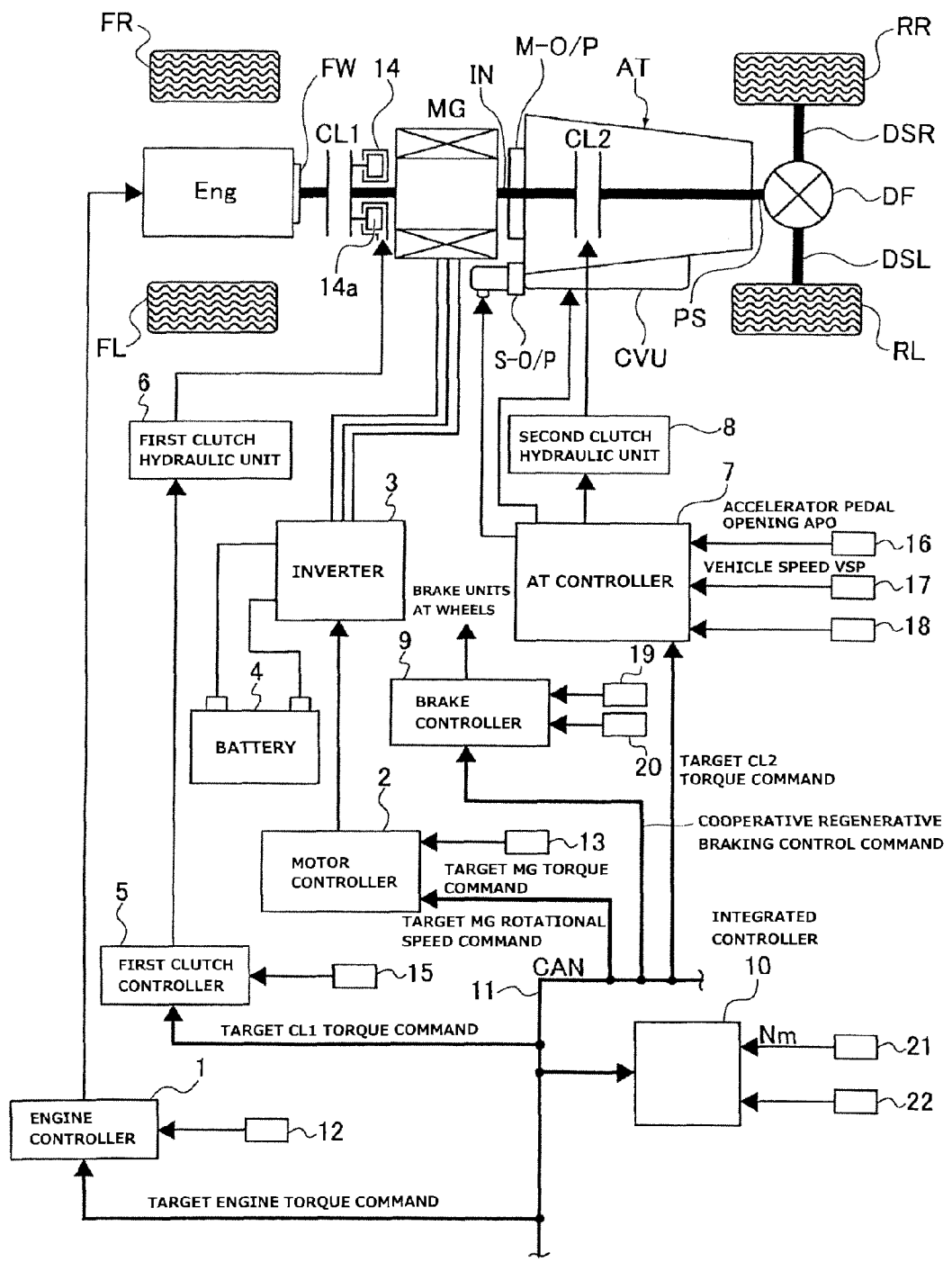
FIG. 1 is a whole system diagram showing an FR hybrid vehicle to which a control apparatus according to a first embodiment is applied.

The following describes the best form for carrying out the hybrid vehicle control apparatus according to the present invention, with reference to a first embodiment and a second embodiment shown in the drawings.

First Embodiment

First, the following describes a configuration of a control apparatus of an FR hybrid vehicle of a one-motor two-clutches type (an example of hybrid vehicle) according to the first embodiment will be described separately in "Whole System Configuration", "Configuration of Automatic Transmission", and "Configuration of Engagement Start Judgment Process".

[Whole System Configuration]

Figure 2:
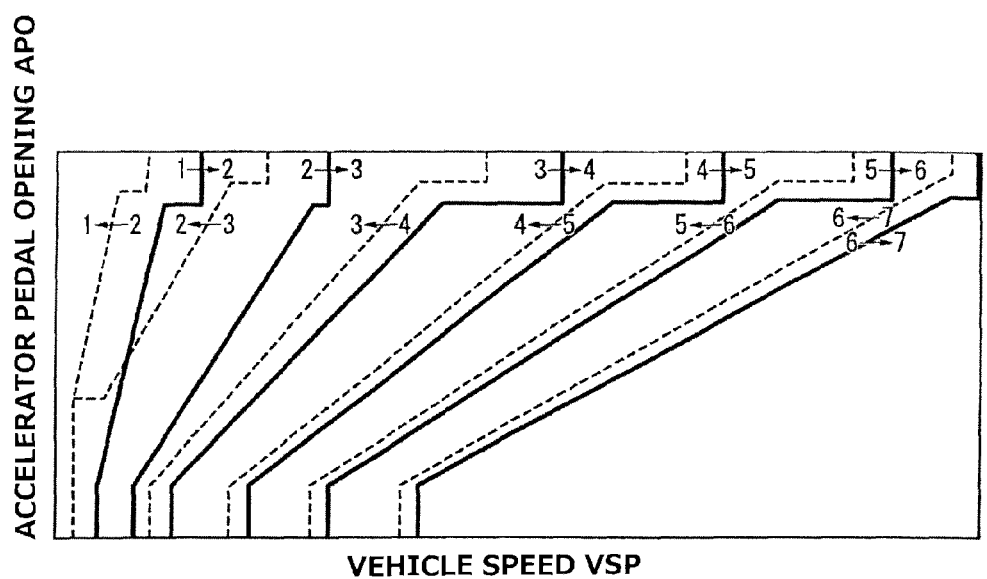
FIG. 2 is a diagram showing an example of shift map of an automatic transmission "AT", which is set in an AT controller 7 according to the first embodiment.
Figure 3:
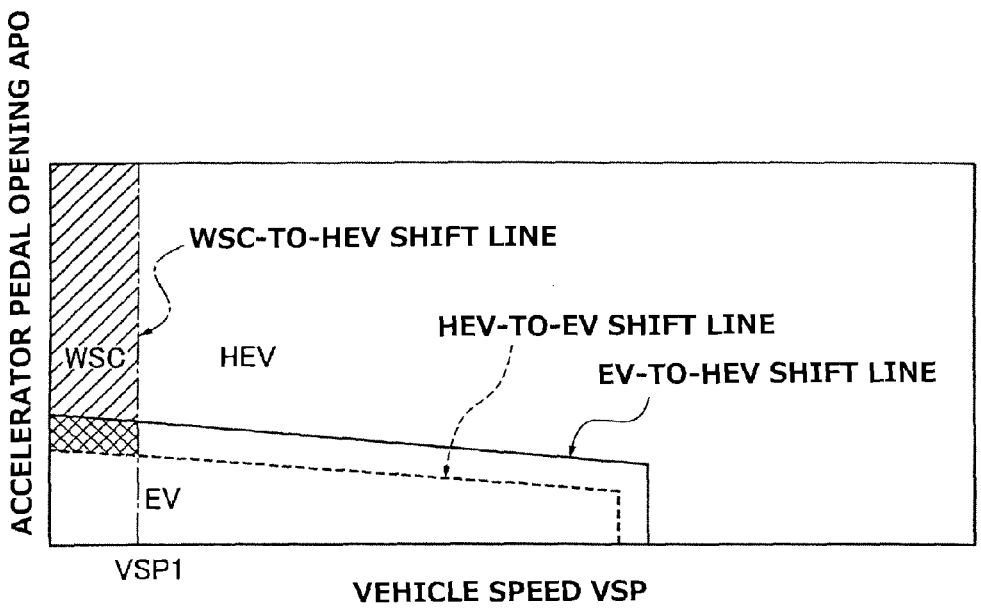
FIG. 3 is a diagram showing an example of EV-HEV selection map, which is set in a mode selection part of an integrated controller 10 according to the first embodiment.

FIG. 1 shows the FR hybrid vehicle to which a control apparatus according to the first embodiment is applied. FIG. 2 shows an example of shift map of an automatic transmission "AT", which is set in an AT controller 7 according to the first embodiment. FIG. 3 shows an example of EV-HEV selection map, which is set in a mode selection part of an integrated controller 10 according to the first embodiment. The following describes the whole system configuration with reference to FIGS. 1 to 3.

As shown in FIG. 1, a driveline of the FR hybrid vehicle includes an engine "Eng", a flywheel "FW", a first clutch CL1, a motor generator "MG" (motor), a second clutch CL2, automatic transmission AT, a transmission input shaft "IN", a main oil pump "M-O/P", an auxiliary oil pump "S-O/P", a propeller shaft "PS", a differential gear "DF", a left drive shaft "DSL", a right drive shaft "DSR", a left rear wheel "RL" (driving wheel), and a right rear wheel "RR" (driving wheel). "FL" represents a left front wheel, and "FR" represents a right front wheel.

Engine Eng is a gasoline engine or diesel engine, which is controlled based on an engine control command from an engine controller 1 so that an engine start control, an engine stop control, a throttle valve opening control, a fuel cut control, and others are performed. Flywheel FW is attached to an output shaft of the engine.

First clutch CL1 is arranged between engine Eng and motor generator MG, and is controlled to be completely engaged, or slip-engaged, or completely disengaged by a first clutch control hydraulic pressure that is produced by a first clutch hydraulic unit 6 based on a first clutch control command from a first clutch controller 5.

Motor generator MG is a synchronous motor generator in which a permanent magnet is embedded in a rotor and a stator coil is wounded around a stator. Motor generator MG is controlled based on a control command from a motor controller 2 so that three phase alternating currents are generated and applied to motor generator MG by an inverter 3. Motor generator MG can function as an electric motor that rotates based on power supply from a battery 4 ("power running"), and function also as an electric generator to charge battery 4 by generating an electromotive force between ends of the stator coil when the rotor receives a rotational energy from engine Eng and the driving wheels ("regeneration"). The rotor of motor generator MG is coupled to transmission input shaft IN of automatic transmission AT.

Second clutch CL2 is arranged between motor generator MG and left and right rear wheels RL, RR. Second clutch CL2 is a starting engagement element that is engaged when a selecting operation from the N range to the D range (or an R range) is performed. Second clutch CL2 is controlled to be completely engaged, slip-engaged, or completely disengaged by a control hydraulic pressure that is produced by a second clutch hydraulic unit 8 based on a second clutch control command from AT controller 7. For example, second clutch CL2 is implemented by a normally open wet type multiplate clutch or brake, wherein the flow rate and hydraulic pressure of working fluid can be controlled continuously by a proportional solenoid valve. First clutch hydraulic unit 6 and second clutch hydraulic unit 8 are installed in a hydraulic valve control unit "CVU" that is provided with automatic transmission AT.

Automatic transmission AT accommodates second clutch CL2 as an engagement element. Automatic transmission AT is a transmission which automatically shifts among a plurality of stepwise gear positions, depending on vehicle speed and accelerator pedal opening. Transmission input shaft IN of automatic transmission AT (namely, motor shaft) is provided with main oil pump M-O/P that is driven by transmission input shaft IN. Auxiliary oil pump S-O/P is provided at a motor housing or the like. Auxiliary oil pump S-O/P is driven by an electric motor for suppressing the hydraulic pressure from falling when the discharge pressure of main oil pump M-O/P is short while the vehicle is stationary or so. Drive control of auxiliary oil pump S-O/P is performed by AT controller 7 described below. A transmission output shaft of automatic transmission AT is coupled to propeller shaft PS. Propeller shaft PS is coupled to left and right rear wheels RL, RR through differential gear DF, left drive shaft DSL, and right drive shaft DSR.

The hybrid vehicle employs drive modes which are different in drive form, wherein the drive modes include an electric vehicle mode (henceforth called "EV mode"), a hybrid vehicle mode (henceforth called "HEV mode"), and a drive torque control mode (henceforth called "WSC mode").

The EV mode is a mode in which first clutch CL1 is disengaged and the vehicle is driven only by the driving force of motor generator MG. The EV mode includes a motor drive mode and a regenerative drive mode. The EV mode is selected, for example, when a requested driving force is small, and the battery SOC is sufficient.

The HEV mode is a mode in which the vehicle is driven with first clutch CL1 engaged. The HEV mode includes a motor assist drive mode, an electric power generation drive mode, and an engine drive mode, one of which is selected for driving the vehicle. The HEV mode is selected, for example, when the requested driving force is large, or when the battery SOC is insufficient.

The WSC mode is a mode in which second clutch CL2 is slip-engaged, and the torque capacity of second clutch CL2 is controlled so that a clutch transmitted torque passing through the second clutch CL2 is conformed to the requested driving torque determined depending on driver's operation or the like. The WSC mode is selected, when the driving wheel rotational speed gets below the engine rotational speed so that it is necessary to absorb the differential rotation therebetween by slippage of second clutch CL2, for example, when the vehicle is stationary or in an acceleration start region.

The following describes a control system of the FR hybrid vehicle. As shown in FIG. 1, the control system of the FR hybrid vehicle includes engine controller 1, motor controller 2, inverter 3, battery 4, first clutch controller 5, first clutch hydraulic unit 6, AT controller 7, second clutch hydraulic unit 8, a brake controller 9, and integrated controller 10. Controllers 1, 2, 5, 7 and 9, and integrated controller 10 are connected through a CAN communication line 11 for exchanging information with each other.

Engine controller 1 receives input of information about engine rotational speed from an engine rotational speed sensor 12, and input of a target engine torque command from integrated controller 10, and input of other necessary information. Engine controller 1 outputs a command for controlling an engine operating point (Ne, Te), to a throttle valve actuator of engine Eng and others.

Motor controller 2 receives input of information from a resolver 13 that senses a rotor angular position of motor generator MG, and input of a target MG torque command and a target MG rotational speed command from integrated controller 10, and input of other necessary information. Motor controller 2 outputs to inverter 3 a command for controlling a motor operating point (Nm, Tm) of motor generator MG. Motor controller 2 monitors the battery SOC indicating the state of charging of battery 4, and provides the battery SOC information to integrated controller 10 through CAN communication line 11.

First clutch controller 5 receives input of sensor information from a first clutch stroke sensor 15 that senses the stroke position of a piston 14a of a hydraulic actuator 14, and input of a target CL1 torque command from integrated controller 10, and input of other necessary information. First clutch controller 5 outputs a command for controlling engagement and disengagement of first clutch CL1, to first clutch hydraulic unit 6 in hydraulic valve control unit CVU.

AT controller 7 receives input of information from an accelerator opening sensor 16, a vehicle speed sensor 17, an inhibitor switch 18, etc. When the vehicle is running with the D range selected, an optimal gear position is found based on the position of an operating point in the shift map shown in FIG. 2, wherein the operating point is defined by an accelerator pedal opening APO and a vehicle speed VSP, and a control command for obtaining the found gear position is outputted to hydraulic valve control unit CVU. In addition to this shift control, if the target CL2 torque command is inputted from integrated controller 10, a second clutch control is performed to output a command for controlling slip-engagement of second clutch CL2, to second clutch hydraulic unit 8 in hydraulic valve control unit CVU.

Brake controller 9 receives input of sensor information from a wheel speed sensor 19 for measuring the wheel speed of each of the four wheels, and a brake stroke sensor 20, and input of a cooperative regeneration control command from integrated controller 10, and input of other necessary information. For example, when a brake pedal is depressed for braking and a requested braking force calculated from a brake stroke BS is not satisfied only by a regenerative braking force, brake controller 9 performs a cooperative regenerative braking control for covering the shortage with a mechanical braking force (hydraulic braking force or motor braking force).

Integrated controller 10 manages consumed energy of the whole vehicle, and functions to allow the vehicle to travel at an optimized efficiency. Integrated controller 10 receives input of necessary information from a motor rotational speed sensor 21 for measuring motor rotational speed Nm, and other sensors, switches, etc. 22, and input of information through CAN communication line 11. Integrated controller 10 outputs a target engine torque command to engine controller 1, a target MG torque command and a target MG rotational speed command to motor controller 2, a target CL1 torque command to first clutch controller 5, a target CL2 torque command to AT controller 7, and a cooperative regenerative control command to brake controller 9.

Integrated controller 10 includes a mode selection section that finds an optimal drive mode depending on the position of the operating point on the EV-HEV selection map shown in FIG. 3, wherein the operating point is defined by accelerator pedal opening APO and vehicle speed VSP, and selects the found drive mode as a target drive mode. In the EV-HEV selection map, an EV-to-HEV shift line for shifting from the EV mode to the HEV mode, an HEV-to-EV shift line for shifting from the HEV mode to the EV mode, and a WSC-to-HEV shift line for shifting from the WSC mode to the HEV mode, are set. The EV-to-HEV shift line and the HEV-to-EV shift line are set with an amount of hysteresis. The WSC-to-HEV shift line is set according to a first set vehicle speed VSP1 with which engine Eng keeps an idle rotational speed in the first gear position of automatic transmission AT. However, when the battery SOC becomes lower than or equal to a predetermined value while the EV mode is selected, the target drive mode is forced to be set to the HEV mode.

[Configuration of Automatic Transmission]

Figures 4, 5:
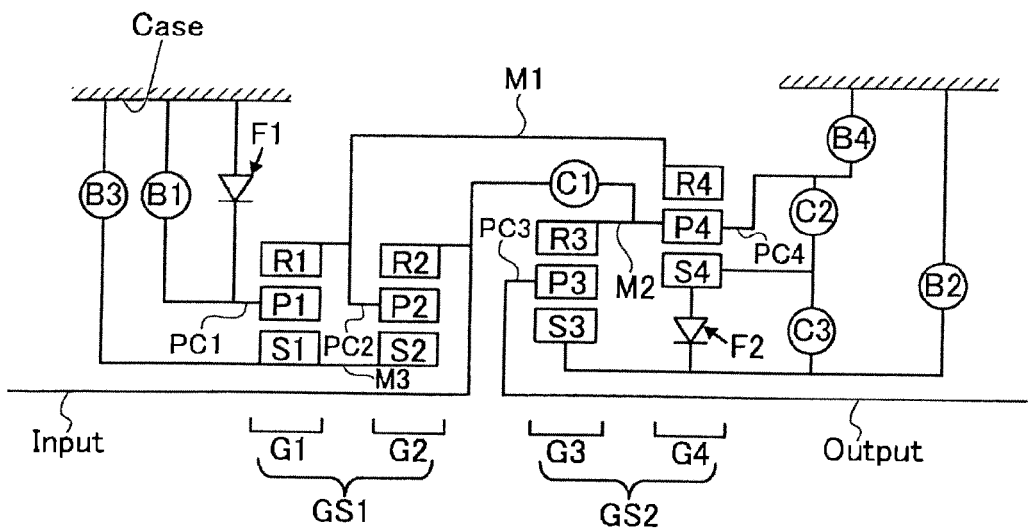
FIG. 4 is a skeleton diagram showing an example of automatic transmission AT mounted on the FR hybrid vehicle to which the control apparatus according to the first embodiment is applied.
FIG. 5 is an engagement operation table showing engagement states of friction engagement elements in individual speed gears in automatic transmission AT mounted on the FR hybrid vehicle to which the control apparatus according to the first embodiment is applied.

FIG. 4 shows an example of automatic transmission AT mounted on the FR hybrid vehicle to which the control apparatus according to the first embodiment is applied. FIG. 5 shows engagement states of friction engagement elements in individual speed gears in automatic transmission AT mounted on the FR hybrid vehicle to which the control apparatus according to the first embodiment is applied. The following describes configuration of automatic transmission AT with reference to FIGS. 4 and 5.

Automatic transmission AT is a seven forward speed and one reverse speed stepwise automatic transmission. Automatic transmission AT receives input of the driving force of at least one of engine Eng and motor generator MG through a transmission input shaft "Input", and shifts the rotational speed by four planetary gears and seven friction engagement elements, and outputs it through a transmission output shaft "Output".

Automatic transmission AT includes a speed-shifting gear mechanism including a first planetary gear set GS1 and a second planetary gear set GS2 which are arranged along an axis extending from transmission input shaft Input to transmission output shaft Output. First planetary gear set GS1 includes a first planetary gear G1 and a second planetary gear G2. Second planetary gear set GS2 includes a third planetary gear G3 and a fourth planetary gear G4. Moreover, a first clutch C1, a second clutch C2, a third clutch C3, a first brake B1, a second brake B2, a third brake B3, and a fourth brake B4 are arranged as friction engagement elements. Moreover, a first one-way clutch F1, and a second one-way clutch F2 are arranged.

First planetary gear G1 includes a first sun gear S1, a first ring gear R1, a first pinion P1, and a first carrier PC1. Second planetary gear G2 includes a second sun gear S2, a second ring gear R2, a second pinion P2, and a second carrier PC2. Third planetary gear G3 includes a third sun gear S3, a third ring gear R3, a third pinion P3, and a third carrier PC3. Fourth planetary gear G4 includes a fourth sun gear S4, a fourth ring gear R4, a fourth pinion P4, and a fourth carrier PC4. Namely, first to fourth planetary gears G1 to G4 are single-pinion planetary gears.

Transmission input shaft Input is coupled to second ring gear R2, and receives input of a driving torque from at least one of engine Eng and motor generator MG. Transmission output shaft Output is coupled to third carrier PC3, and transmits an output driving torque through a final gear and the like to the driving wheels (left and right rear wheels RL, RR).

First ring gear R1, second carrier PC2, and fourth ring gear R4 are coupled integrally by a first coupling member M1. Third ring gear R3 and fourth carrier PC4 are coupled integrally by a second coupling member M2. First sun gear S1 and second sun gear S2 are coupled integrally by a third coupling member M3.

First clutch C1 (namely, input clutch I/C) selectively connects the transmission input shaft Input to second coupling member M2 and disconnects the transmission input shaft Input from second coupling member M2. Second clutch C2 (namely, direct clutch D/C) selectively connects fourth sun gear S4 to fourth carrier PC4 and disconnects fourth sun gear S4 from fourth carrier PC4. Third clutch C3 (namely, H&LR clutch H&LR/C) selectively connects third sun gear S3 to fourth sun gear S4 and disconnects the third sun gear S3 from fourth sun gear S4. Second one-way clutch F2 (namely, first and second speed gears one-way clutch 1&2OWC) is provided between third sun gear S3 and fourth sun gear S4, and is selectively connected and disconnected mechanically. First brake B1 (namely, front brake Fr/B) selectively holds the first carrier PC1 stationary with respect to a transmission case "Case" and allows the first carrier PC1 to rotate with respect to transmission case Case. First one-way clutch F1 (namely, first speed gear one-way clutch 1stOWC) is arranged in parallel to first brake B1, and is selectively connected and disconnected mechanically. Second brake B2 (namely, low brake LOW/B) selectively holds the third sun gear S3 stationary with respect to transmission case Case and allows the third sun gear S3 to rotate with respect to transmission case Case. Third brake B3 (namely, 2346-brake "2346/B") selectively holds the third coupling member M3 stationary with respect to transmission case Case and allows the third coupling member M3 to rotate with respect to transmission case Case, wherein third coupling member M3 couples first sun gear S1 and second sun gear S2 together. Fourth brake B4 (namely, reverse brake R/B) selectively holds the third carrier PC3 stationary with respect to transmission case Case and allows the third carrier PC3 to rotate with respect to transmission case Case.

The following describes engagement operation in each gear position with reference to FIG. 5. In the engagement operation table of FIG. 5, each open circle represents a condition in which a corresponding friction engagement element is hydraulically engaged in a drive state, and each bracketed open circle represents a condition in which a corresponding friction engagement element is hydraulically engaged in a coast state (it functions as a one-way clutch in a drive state), and each blank cell represents a condition in which a corresponding friction engagement element is disengaged.

Each of the seven gear positions is obtained by an engagement switch including a shift of one of the friction engagement elements provided in the speed-shifting gear mechanism constructed as described above from an engaged state to a disengaged state, and a shift of another of the friction engagement elements from a disengaged state to an engaged state, as described below. In addition, one reverse gear position is obtained.

In first gear, first brake B1 (with engagement of first one-way clutch F1), and third clutch C3 (with engagement of second one-way clutch F2), and second brake B2 are engaged. In second gear, third clutch C3 (with engagement of second one-way clutch F2), and second brake B2, and third brake B3 are engaged. In third gear, second brake B2, third brake B3, and second clutch C2 are engaged. In fourth gear, third brake B3, second clutch C2, and third clutch C3 are engaged. In fifth gear, first clutch C1, second clutch C2, and third clutch C3 are engaged. In sixth gear, third brake B3, first clutch C1, and third clutch C3 are engaged. In seventh gear, first brake B1 (with engagement of first one-way clutch F1), and first clutch C1, and third clutch C3 are engaged. In reverse gear, fourth brake B4, first brake B1, and third clutch C3 are engaged. In this way, during the selecting operation from the N range to the D range, second brake B2 (namely, low brake LOW/B) is engaged. Accordingly, second brake B2 is a friction engagement element to which engagement start judgment according to the first embodiment is targeted.

[Configuration of Engagement Start Judgment Process]

Figure 6:
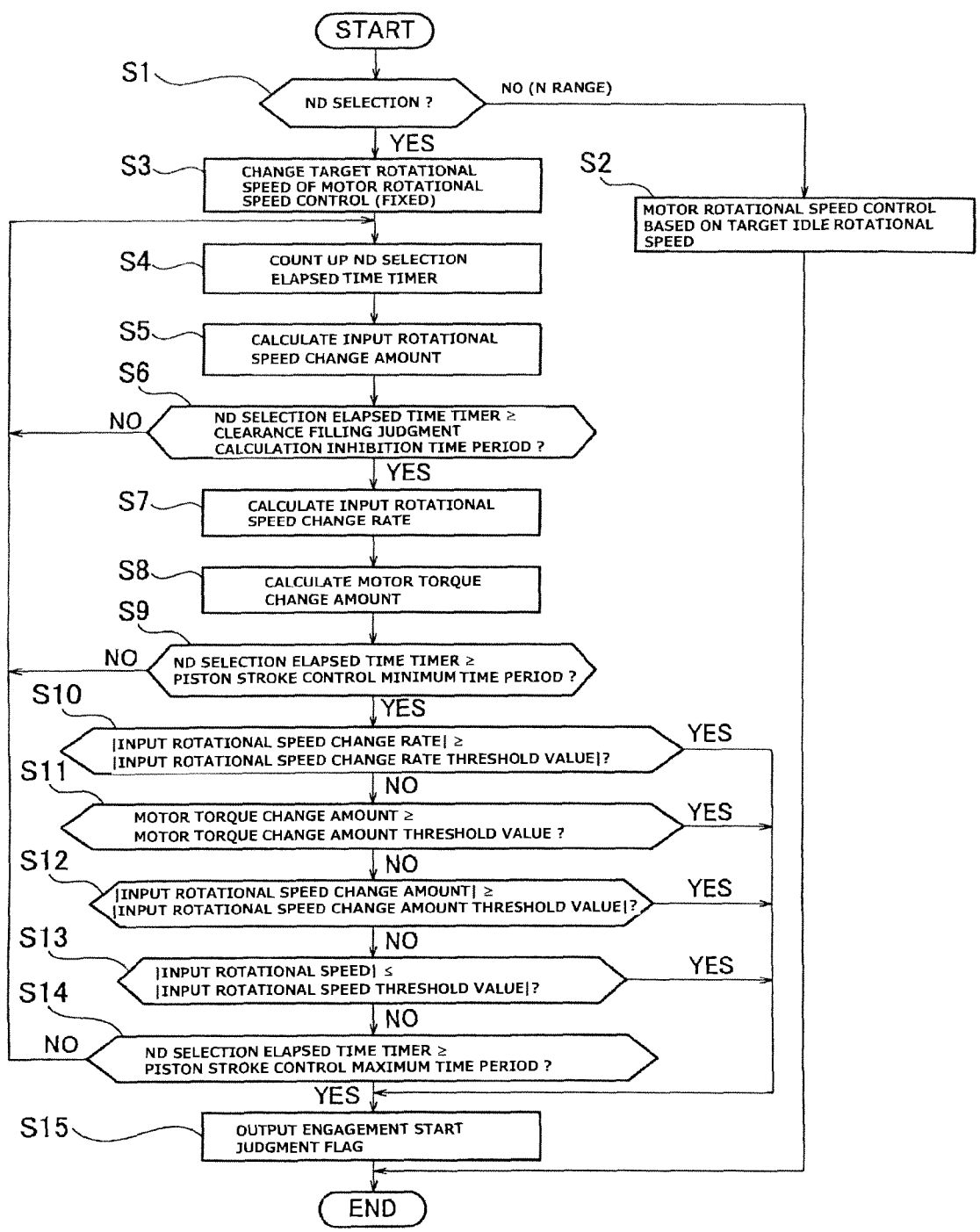
FIG. 6 is a flow chart showing a flow of an engagement start judgment process for a second brake B2 (namely, low brake LOW/B), which is performed by the integrated controller when a selecting operation from an N range to a D range is performed in the first embodiment.

FIG. 6 is a flow chart showing a flow of engagement start judgment process about second brake B2 (namely, low brake LOW/B) which is performed by integrated controller 10 when the selecting operation from the N range to the D range is performed, according to the first embodiment. The following describes steps in FIG. 6, which constitute the engagement start judgment process. The control process of FIG. 6 is performed repeatedly at intervals of a predetermined control start time period.

At Step S1, integrated controller 10 judges whether or not N-to-D selecting operation has been performed, based on switching of the range position signal from inhibitor switch 18 from the N range signal to the D range signal. When the answer is YES (when the N-to-D selecting operation has been performed), the process proceeds to Step S3. When the answer is NO (when the N range is selected), the process proceeds to Step S2.

At Step S2, following the judgment at Step S1 that the N range is being selected, integrated controller 10 performs a motor rotational speed control in which the target rotational speed is set to the target idle rotational speed (variable rotational speed), and proceeds to the end. The target idle rotational speed is set to a high idle rotational speed when the engine coolant temperature is in an extremely low temperature region, wherein the high idle rotational speed is higher than a normal idle rotational speed. As the engine coolant temperature rises by warming-up operation, the target idle rotational speed is set to decrease gradually from the high idle rotational speed to the normal idle rotational speed. After the engine coolant temperature exceeds or becomes equal to a predetermined temperature, the target idle rotational speed is held at the normal idle rotational speed.

At Step S3, following the judgment at Step S1 that the N-to-D selecting operation has been performed, integrated controller 10 shifts the target rotational speed from the target rotational speed in the motor rotational speed control when the N range is being selected (variable rotational speed) to the transmission input rotational speed at the time of the N-to-D selecting operation (fixed rotational speed), and then proceeds to Step S4 (input rotational speed keeping control means). Namely, after the N-to-D selecting operation, the motor rotational speed control is performed so as to keep the transmission input rotational speed at the time of the N-to-D selecting operation.

At Step S4, following the shift of the target rotational speed in the motor rotational speed control at Step S3, integrated controller 10 counts up an ND selection elapsed time timer which indicates a time period elapsed after the N-to-D selecting operation, and then proceeds to Step S5.

At Step S5, following the count-up of the ND selection elapsed time timer at Step S4, integrated controller 10 performs a calculation operation for calculating an input rotational speed change amount that is an amount of decrease of the rotational speed from the transmission input rotational speed at the time of the N-to-D selecting operation, and then proceeds to Step S6.

At Step S6, following the calculation operation of the input rotational speed change amount at Step S5, integrated controller 10 judges whether or not the ND selection elapsed time timer exceeds or becomes equal to a clearance filling judgment calculation inhibition time period, namely, whether or not a predetermined time period has elapsed from the time of start of engagement control of second brake B2 as a friction engagement element to the time when it becomes possible to judge convergence of the rotational fluctuation of the drive source due to the external factor other than engagement start of second brake B2. When the answer is YES (the ND selection elapsed time timer≥the clearance filling judgment calculation inhibition time period), the process proceeds to Step S7. When the answer is NO (the ND selection elapsed time timer<the clearance filling judgment calculation inhibition time period), the process returns to Step S4. The clearance filling judgment calculation inhibition time period is set to a time period when incorrect clearance filling judgment is possible because it is possible that the input rotational speed change rate (Steps S7) and the motor torque change amount (Step S8) which are used for clearance filling judgment are calculated to be excessive in absolute value.

At Step S7, following the judgment of the ND selection elapsed time timer≥the clearance filling judgment calculation inhibition time period at Step S6, integrated controller 10 performs a calculation operation for calculating an input rotational speed change rate that is a rate of change of rotational speed of transmission input shaft Input, and then proceeds to Step S8. The input rotational speed change rate can be obtained by differentiating the input rotational speed with respect to time.

At Step S8, following the calculation operation for the input rotational speed change rate at Step S7, integrated controller 10 performs a calculation operation for calculating a motor torque change amount that is an amount of change of load of motor generator MG which changes along with the motor rotational speed control for keeping the transmission input rotational speed, and then proceeds to Step S9. The motor torque change amount is not from the time of the N-to-D selecting operation, but the minimum value of the motor torque is constantly undated and memorized from the time the engagement start judgment is started. Then, the motor torque change amount is calculated by subtracting the memorized motor torque minimum value STMG_MIN from the presently obtained motor torque (for example, in the form of motor current value).

At Step S9, following the calculation operation for the motor torque change amount at Step S8, integrated controller 10 judges whether or not the ND selection elapsed time timer has exceeded or become equal to a piston stroke control minimum time period. When the answer is YES (the ND selection elapsed time timer the piston stroke control minimum time period), the process proceeds to Step S10. When the answer is NO (the ND selection elapsed time timer<the piston stroke control minimum time period), the process returns to Step S4. The piston stroke control minimum time period is determined based on experimental data about a time period from start of piston stroke control to end of piston stroke control which is obtained with varying transmission input rotational speed, oil temperature, etc. For example, the piston stroke control minimum time period is set to a minimum one of experimental values of the time period to the end of piston stroke control. This timer (piston stroke control minimum time period) is set to a time period between the following time periods (1) and (2).

(1) A sufficient time period for convergence of the input rotational speed to the target rotational speed (namely, the rotational speed at the time of the selection) by the control for keeping the input rotational speed constant after the selection.
(2) A minimum time period to the time of engagement of the clutch by piston stroke control.

Figure 7:
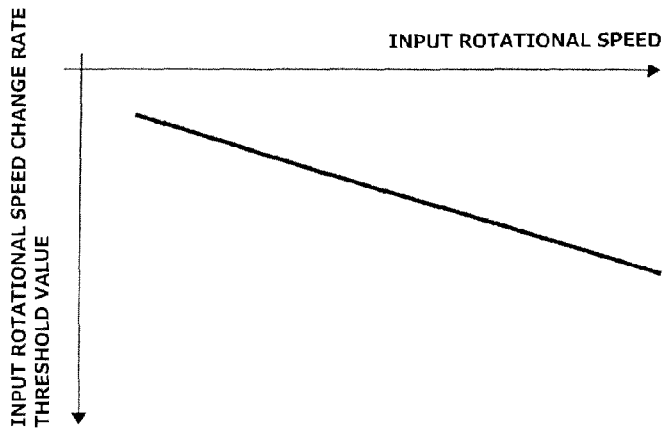
FIG. 7 is an input rotational speed change rate threshold value map showing relational characteristics of an input rotational speed change rate with respect to an input rotational speed, which is used in the engagement start judgment operation for the second brake B2 shown in FIG. 6.

At Step S10, following the judgment of the ND selection elapsed time timer≥the piston stroke control minimum time period at Step S9, integrated controller 10 judges whether or not the absolute value of the last value of the input rotational speed change rate calculated at Step S7 is greater than or equal to the absolute value of an input rotational speed change rate threshold value. When the answer is YES (|the input rotational speed change rate|≥|the input rotational speed change rate threshold value|), the process proceeds to Step S15. When the answer is NO (|the input rotational speed change rate|<|the input rotational speed change rate threshold value|), the process proceeds to Step S11. The absolute value of the input rotational speed change rate threshold value is set greater when it is possible to judge the rotational fluctuation of engine Eng to be large (for example, under the condition of high idle rotational speed at cold state) than when it is possible to judge the rotational fluctuation of engine Eng to be small (for example, under the condition of normal idle rotational speed after warming-up). Specifically, as shown in FIG. 7, the absolute value of the input rotational speed change rate threshold value is set to gradually increase in the negative direction as the input rotational speed to automatic transmission AT increases.

Figure 8:
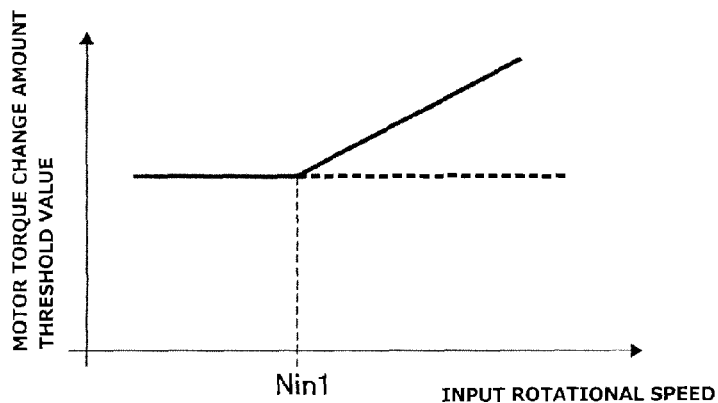
FIG. 8 is a motor torque change amount threshold value map showing relational characteristics of a motor torque change amount with respect to the input rotational speed, which is used in the engagement start judgment operation for the second brake B2 shown in FIG. 6.

At Step S11, following the judgment of |the input rotational speed change rate|<|the input rotational speed change rate threshold value| at Step S10, integrated controller 10 judges whether or not the last value of the motor torque change amount calculated at Step S8 is greater than or equal to a motor torque change amount threshold value. When the answer is YES (the motor torque change amount≥the motor torque change amount threshold value), the process proceeds to Step S15. When the answer is NO (the motor torque change amount<the motor torque change amount threshold value), the process proceeds to Step S12. The motor torque change amount threshold value is set larger when it is possible to judge the rotational fluctuation of engine Eng to be large (for example, when the motor rotational speed control is performed for keeping the high idle rotational speed at cold state) than when it is possible to judge the rotational fluctuation of engine Eng to be small (for example, when the motor rotational speed control is performed for keeping the normal idle rotational speed after warming-up). Specifically, as shown in FIG. 8, the motor torque change amount threshold value is set to a constant value before the input rotational speed to automatic transmission AT reaches a set rotational speed Nin1, and is set so that the motor torque change amount threshold value increases gradually as the input rotational speed increases after exceeding the set rotational speed Nin1.

At Step S12, following the judgment of the motor torque change amount<the motor torque change amount threshold value at Step S11, integrated controller 10 judges whether or not the absolute value of the last value of the input rotational speed change amount calculated at Step S5 is greater than or equal to the absolute value of an input rotational speed change amount threshold value. When the answer is YES (|the input rotational speed change amount|≥|the input rotational speed change amount threshold value|), the process proceeds to Step S15. When the answer is NO (|the input rotational speed change amount|<|the input rotational speed change amount threshold value|), the process proceeds to Step S13. The absolute value of the input rotational speed change amount threshold value is set by measuring an amount of decrease of the input rotational speed experimentally or the like, wherein the input rotational speed decreases due to increase of the load of the driveline by start of engagement of second brake B2 (namely, low brake LOW/B).

At Step S13, following the judgment of |the input rotational speed change amount|<|the input rotational speed change amount threshold value| at Step S12, integrated controller 10 judges whether or not the absolute value of the input rotational speed to automatic transmission AT (namely, the motor rotational speed Nm from motor rotational speed sensor 21) is lower than or equal to the absolute value of the input rotational speed threshold value. When the answer is YES (|the input rotational speed|≤|the input rotational speed threshold value|), the process proceeds to Step S15. When the answer is NO (|the input rotational speed|>|the input rotational speed threshold value|), the process proceeds to Step S14. The absolute value of the input rotational speed threshold value is set by determining the value of the input rotational speed experimentally or the like, wherein the input rotational speed decreases due to increase of the load of the driveline by start of engagement of second brake B2 (namely, low brake LOW/B).

At Step S14, following the judgment of |the input rotational speed|>|the input rotational speed threshold value| at Step S13, integrated controller 10 judges whether or not the ND selection elapsed time timer has become greater than or equal to a piston stroke control maximum time period. When the answer is YES (the ND selection elapsed time timer≥the piston stroke control maximum time period), the process proceeds to Step S15. When the answer is NO (the ND selection elapsed time timer<the piston stroke control maximum time period), the process returns to Step S4. The piston stroke control maximum time period is determined based on experimental data about a time period from start of piston stroke control to end of piston stroke control which is obtained with varying transmission input rotational speed, oil temperature, etc. For example, the piston stroke control maximum time period is set to a maximum one of experimental values of the time period to the end of piston stroke control.

At Step S15, integrated controller 10 outputs an engagement start judgment flag in response to a judgment that at one of Steps S10 to S14 as engagement start judgment steps, a condition for engagement start judgment is satisfied, and proceeds to the end. When second brake B2 (namely, low brake LOW/B) is judged to have started to be engaged, integrated controller 10 starts a WSC mode control by slip-engagement for absorbing the differential rotation between engine Eng and left and right rear wheels RL, RR while controlling the engagement capacity control for obtaining the transmitted torque according to the requested driving torque.

The following describes actions of the control apparatus for the hybrid vehicle according to the first embodiment in separate sections "Reason for Necessity of Accurate Engagement Start Judgment", "Action of Engagement Start Judgment at N-To-D Selecting Operation", "Action of Setting of Input Rotational Speed Change Rate Threshold Value and Motor Torque Change Amount Threshold Value", and "Action of WSC Mode Control Based on Engagement Start Judgment under Condition of Decrease of Idle Rotational Speed".

[Reason for Necessity of Accurate Engagement Start Judgment]

In the case of engagement start judgment at the time of N-to-D selecting operation, the WSC mode control with indication of zero torque is started in response to an engagement start judgment as a trigger. Accordingly, the present judgment logic is necessary for judging engagement start accurately.

Specifically, second brake B2 (namely, low brake LOW/B), which starts to be engaged in response to N-to-D selecting operation, is controlled in the WSC mode after second brake B2 is judged to have started to be engaged. In this WSC mode control, the requested driving torque is equal to zero when the vehicle is stationary with the brake ON, so that the torque transmitted by second brake B2 is controlled to be very small. Under this condition, the hydraulic pressure must be greater than or equal to a hydraulic pressure allowing the controlled piston to be held under the condition of stroke completion, and be lower than or equal to a hydraulic pressure preventing the endurance of second brake B2 from falling significantly due to slipping. Namely, it is necessary to keep a standby state with a lower hydraulic pressure than the hydraulic pressure used to judge completion of the piston stroke.

Since second brake B2 is slip-engaged according to the requested driving torque after the engagement start judgment, a long time period is necessary to complete the piston stroke even after the start of the WSC mode control, if second brake B2 is incorrectly judged to have started to be engaged although second brake B2 is not yet engaged. When the driver requests a vehicle start by operation of the brake OFF and the accelerator pedal ON while the piston stroke is being completed, the engagement torque capacity of second brake B2 fails to rise even with rising hydraulic pressure, so that a shock may occur due to a time lag or a rapid engagement until the buildup of a torque. This causes the driver to feel uncomfortable due to a time lag or a shock, because G-sensitivity of the driver is high under the condition that the vehicle is started from a standstill.

On the other hand, if second brake B2 is incorrectly judged to start to be engaged after actual engagement start, the hydraulic pressure has become higher at start of the WSC mode control than a prescribed hydraulic pressure used for judgment of piston stroke completion. Accordingly, even if the hydraulic pressure is lowered for standby after the start of the WSC mode control, the standby hydraulic pressure for second brake B2 is maintained at a hydraulic pressure causing a torque capacity. Accordingly, if the time period from the time of N-to-D selecting operation to the time of vehicle start becomes long, the continuation of slip engagement of second brake B2 in which plates of second brake B2 are pressed, causes a frictional heat, and thereby adversely affects the endurance and reliability of second brake B2. Since the rotational speed of left and right rear wheels RL, RR is equal to zero when the vehicle is stationary with standby of hydraulic pressure, the rotational speed of engine Eng is directly equal to the differential rotational speed of second brake B2, which is necessary to be absorbed by slip engagement.

Accordingly, accurate engagement start judgment (clearance filling judgment) is necessary for enhancing the controllability in the WSC mode control after engagement start judgment.

[Action of Engagement Start Judgment at N-To-D Selecting Operation]

The action of engagement start judgment at N-to-D selecting operation according to the first embodiment which is provided with the present judgment logic capable of accurately judging engagement start, with reference to the flow chart shown in FIG. 6.

When the vehicle is stationary with the N range selected, the flow from Step S1 through Step S2 to the end is repeatedly performed in the flow chart of FIG. 6. Namely, at Step S2, the motor rotational speed control is performed with the target rotational speed set at the target idle rotational speed (variable rotational speed) of engine Eng. In this motor rotational speed control, the target rotational speed is set by one of the following three patterns.

(a) When in a cold state where the engine coolant temperature is in an extremely low region, for example, when the vehicle is started under cold weather, the target rotational speed is set to the high idle rotational speed that is higher than the normal idle rotational speed, for promoting the warming-up of engine Eng.
(b) As the engine coolant temperature rises due to the warming-up promotion of engine Eng based on the high idle rotational speed control, the target rotational speed is set to decrease gradually from the high idle rotational speed to the normal idle rotational speed.
(c) When the engine coolant temperature is higher than or equal to a predetermined temperature after the warming-up operation of engine Eng, the target rotational speed is set held at the normal idle rotational speed.

Thereafter, when the driver performs a selecting operation from the N range to the D range, the process proceeds from Step S1 to Step S3 in the flow chart of FIG. 6. At Step S3, the motor rotational speed control is performed to shift the target rotational speed of the motor rotational speed control at the time of selection of the N range (variable rotational speed) to the transmission input rotational speed at the time of N-to-D selecting operation (fixed rotational speed), and then maintain the target rotational speed at the constant input rational speed.

Following the Step S3, the process proceeds from Step S4 through Step S5 to Step S6 in the flow chart of FIG. 6. At Step S6, it is judged whether or not the ND selection elapsed time timer exceeds or becomes equal to the predetermined clearance filling judgment calculation inhibition time period. While it is judged that the ND selection elapsed time timer<the predetermined clearance filling judgment calculation inhibition time period, the flow from Step S4 through Step S5 to Step S6 is repeated. Namely, at Step S4, the ND selection elapsed time timer indicating the elapsed time period from the time of N-to-D selecting operation is counted up, and at Step S5, the input rotational speed change amount is calculated wherein the input rotational speed change amount is an amount of decrease of the rotational speed from the transmission input rotational speed at the time of N-to-D selecting operation.

Thereafter, when the ND selection elapsed time timer exceeds or becomes equal to the clearance filling judgment calculation inhibition time period, the process proceeds from Step S6 through Step S7 and Step S8 to Step S9. At Step S9, it is judged whether or not the ND selection elapsed time timer the piston stroke control minimum time period. While it is judged that the ND selection elapsed time timer<the piston stroke control minimum time period, the flow from Step S4 through Step S5, Step S6, Step S7, and Step S8 to Step S9 is repeated. Namely, at Step S7, the input rotational speed change rate is calculated where the input rotational speed change rate is a rate of change of the rotational speed of transmission input shaft Input, and at Step S8, the motor torque change amount is calculated where the motor torque change amount is an amount of change of the load of motor generator MG.

Thereafter, when the ND selection elapsed time timer exceeds or becomes equal to the clearance filling judgment calculation inhibition time period, and moreover, exceeds or becomes equal to the piston stroke control minimum time period, the judgment operation composed of the following five stages at and after Step S10 is started.

(First Engagement Start Judgment Condition at Step S10)

The first engagement start judgment condition is a condition that the absolute value of the input rotational speed change rate is greater than or equal to the input rotational speed change rate threshold value. When it is judged at Step S10 that |the input rotational speed change rate|<|the input rotational speed change threshold value|), the process proceeds to the next Step S11. When it is judged at Step S10 that |the input rotational speed change rate|≥|the input rotational speed change threshold value|), the process proceeds to the next Step S15 where the engagement start judgment flag is outputted.

(Second Engagement Start Judgment Condition at Step S11)

The second engagement start judgment condition is a condition that the motor torque change amount is larger than or equal to the motor torque change amount threshold value. When it is judged at Step S11 that the motor torque change amount<the motor torque change amount threshold value, the process proceeds to Step S12. When it is judged at Step S11 that the motor torque change amount≥the motor torque change amount threshold value, the process proceeds to Step S15 where the engagement start judgment flag is outputted.

(Third Engagement Start Judgment Condition at Step S12)

The third engagement start judgment condition is a condition that the absolute value of the input rotational speed change amount is greater than or equal to the absolute value of the input rotational speed change amount threshold value. When it is judged at Step S12 that |the input rotational speed change amount|<|the input rotational speed change amount threshold value|, the process proceeds to Step S13. When it is judged at Step S12 that |the input rotational speed change amount|≥|the input rotational speed change amount threshold value|, the process proceeds to Step S15 where the engagement start judgment flag is outputted.

(Fourth Engagement Start Judgment Condition at Step S13)

The fourth engagement start judgment condition is a condition that the absolute value of the input rotational speed is lower than or equal to the absolute value of the input rotational speed threshold value, in other words, a condition that the amount of decrease of the input rotational speed with respect to the target rotational speed as "a parameter that changes along with a rotational fluctuation of the drive source" is greater than or equal to the threshold value. When it is judged at Step S13 that |the input rotational speed|>|the input rotational speed threshold value|, the process proceeds to Step S14. When it is judged at Step S13 that |the input rotational speed|≤|the input rotational speed threshold value|, the process proceeds to Step S15 where the engagement start judgment flag is outputted.

(Fifth Engagement Start Judgment Condition at Step S14)

The fifth engagement start judgment condition is a condition that the ND selection elapsed time timer has become greater than or equal to the piston stroke control maximum time period. When it is judged at Step S14 that the ND selection elapsed time timer<the piston stroke control maximum time period, the process returns to Step S4. When it is judged at Step S14 that the ND selection elapsed time timer≥the piston stroke control maximum time period, the process proceeds to Step S15 where the engagement start judgment flag is outputted.

In this way, the action of engagement start judgment at N-to-D selecting operation according to the first embodiment employs a judgment logic having the following features (1) and (2).

(1) As a solution for preventing incorrect judgment for the case where the selecting operation to the D range is performed when the target idle rotational speed in the N range is being reduced gradually from the high idle rotational speed to the normal idle rotational speed, the start of judgment is inhibited until a predetermined time period has elapsed after N-to-D selecting operation. Namely, the start timing of the judgment, which has been at the time of N-to-D selecting operation, is delayed from the time of N-to-D selecting operation.

(2) As a solution for preventing incorrect judgment for the case where the selecting operation to the D range is performed under the high idle condition based on the high idle rotational speed, the absolute value of the input rotational speed change rate threshold value and the motor torque change amount threshold value are set differently according to the input rotational speed (namely, idle rotational speed). Namely, the judgment threshold values, which have been set to constant values, are set to variable values that are variable according to input rotational speed (namely, idle rotational speed).

[Action of Setting of Input Rotational Speed Change Rate Threshold Value and Motor Torque Change Amount Threshold Value]

Under high idle conditions, the rotational fluctuation of engine Eng is large, so that the possibility for incorrect judgment about engagement start is high. Under such a high idle condition, it is also necessary to prevent incorrect judgment about engagement start. The following describes the action of setting of the input rotational speed change rate threshold value and motor torque change amount threshold value, with reference to FIGS. 9 to 11.

With regard to the input rotational speed change rate that is a parameter for engagement start judgment, the absolute value of the input rotational speed change rate threshold value is set to increase gradually in the negative direction as the input rotational speed to automatic transmission AT increases, at Step S10 in FIG. 6 (see FIG. 7).

Figure 9:
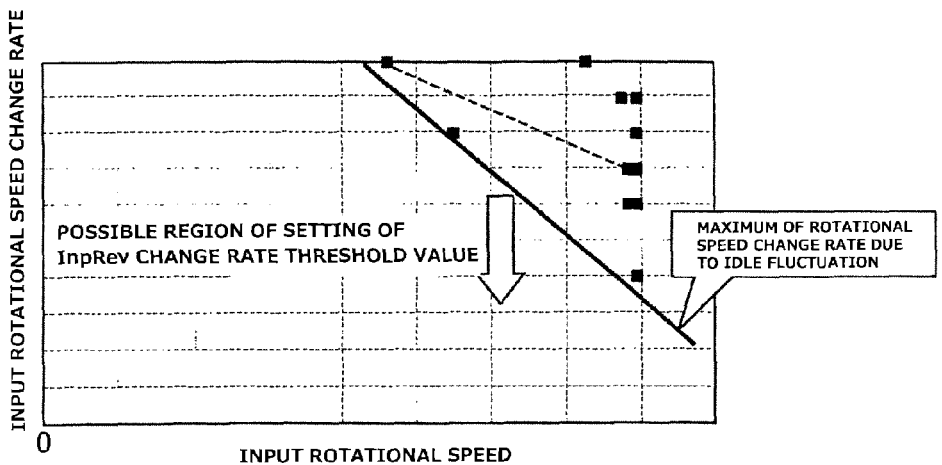
FIG. 9 is a diagram showing an example of experimental data of the input rotational speed change rate with respect to the input rational speed, which shows a region where an input rotational speed change rate threshold value can be set.

Namely, the input rotational speed change rate represents an input rotational speed change rate (namely, a gradient of change of input rotational speed) due to fluctuation of idle rotational speed (henceforth referred to as idle fluctuation). When an experiment about engagement start judgment was performed with respect to input rotational speed, experimental data was obtained which show characteristics of variation that the input rotational speed change rate due to idle fluctuation increases as the input rotational speed to automatic transmission AT (namely, idle rotational speed) increases, as shown in FIG. 9. Namely, as shown by the solid line in FIG. 9, it is necessary to prevent the engagement start judgment from being performed even when the input rotational speed change rate due to idle fluctuation is maximized.

In this way, as the input rotational speed increases, the input rotational speed change rate when the friction engagement element starts to be engaged (negative value) decreases (increases in absolute value). Accordingly, when this parameter (input rotational speed change rate) is used as information for engagement start judgment, the absolute value of the input rotational speed change rate threshold value is set greater under the condition of high idle rotational speed and large idle fluctuation when the engine is in cold state than under the condition of normal idle rotational speed and small idle fluctuation after the engine is warmed up. This serves to prevent incorrect judgment about engagement start under the high idle condition where the input rotational speed is high, and serves to judge the engagement start of second brake B2 accurately based on the input rotational speed change rate as the parameter.

With regard to the motor torque change amount that is a parameter for engagement start judgment, the motor torque change amount threshold value is set constant until the input rotational speed to automatic transmission AT reaches the set rotational speed Nin1, and is set, after exceeding the set rotational speed Nin1, to increase gradually as the input rotational speed increases (see FIG. 8).

Figure 10:
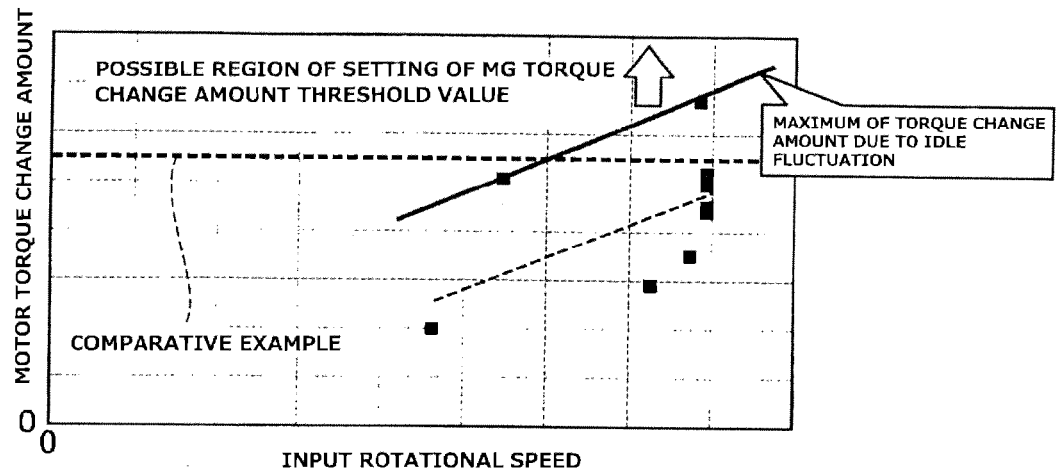
FIG. 10 is a diagram showing an example of experimental data of the motor torque change amount with respect to the input rational speed, which shows a region where a motor torque change amount threshold value can be set.
Figure 11:
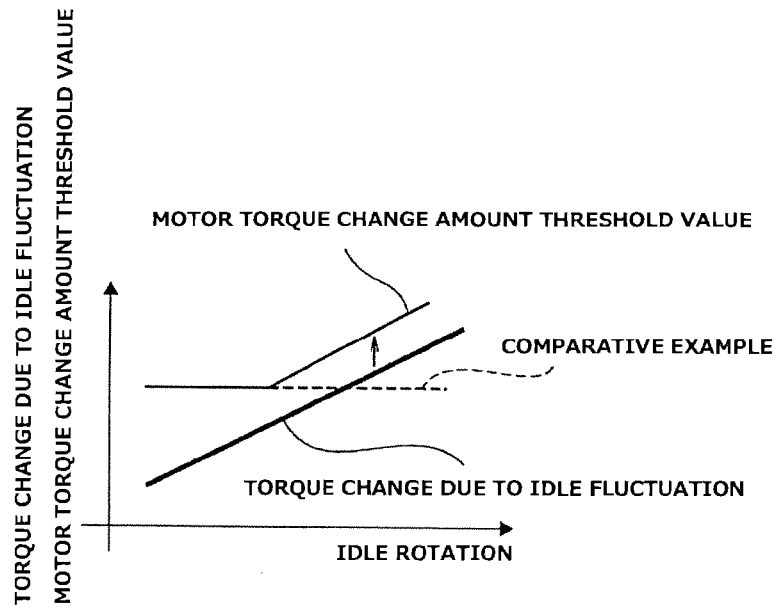
FIG. 11 is an illustration diagram showing an example of setting characteristics of the motor torque change amount threshold value, which is based on experimental data and a comparative example.

Namely, when an experiment for engagement start judgment was performed with respect to input rotational speed, experimental data was obtained which show characteristics of variation that the motor torque change amount due to idle fluctuation increases as the input rotational speed to automatic transmission AT (namely, idle rotational speed) increases, as shown in FIG. 10. Namely, as shown by the solid line in FIG. 10, it is necessary to prevent the engagement start judgment from being performed even when the motor torque change amount due to idle fluctuation is maximized. Accordingly, the motor torque change amount threshold value shown in FIG. 8 is determined by combination of the characteristic of the maximum of the motor torque amount due to idle fluctuation, and the constant motor torque change amount threshold value according to the comparative example, and addition of an amount of error.

In this way, when the idle fluctuation is large when the motor rotational speed control is performed to hold the target rotational speed constant, the motor torque becomes large to hold the rotational speed at the constant target rotational speed with suppressing the idle fluctuation, so that the motor torque change amount increases in proportion to the magnitude of the idle fluctuation. Accordingly, when this parameter (motor torque change amount) is used as information for engagement start judgment, the motor torque change amount threshold value is set larger under the condition of high idle rotational speed and large idle fluctuation when the engine is in cold state than under the condition of normal idle rotational speed and small idle fluctuation after the engine is warmed up. This serves to prevent incorrect judgment about engagement start under the high idle condition where the input rotational speed is high, and serves to judge the engagement start of second brake B2 accurately based on the motor torque change amount as the parameter.

[Action of WSC Mode Control Based on Engagement Start Judgment under Condition of Decrease of Idle Rotational Speed]

The engagement start judgment and the start of the WSC mode are in intimate relationship with each other, because the WSC mode control is started upon judgment of engagement start when the N-to-D selecting operation is performed under the condition that the idle rotational speed is decreasing. The following describes the action of the WSC mode control based on the engagement start judgment under the condition of decrease of idle rotational speed, which reflects the relationship described above, with reference to FIGS. 12 and 13.

First, a comparative example is assumed in which in a situation where a selecting operation is performed from the N range to the D range (or R range) while the idle rotational speed is decreasing from the high idle rotational speed to the normal idle rotational speed, the timing of start of engagement start judgment of second brake B2 is set to the time when the N-to-D selecting operation is performed.

Figure 12:
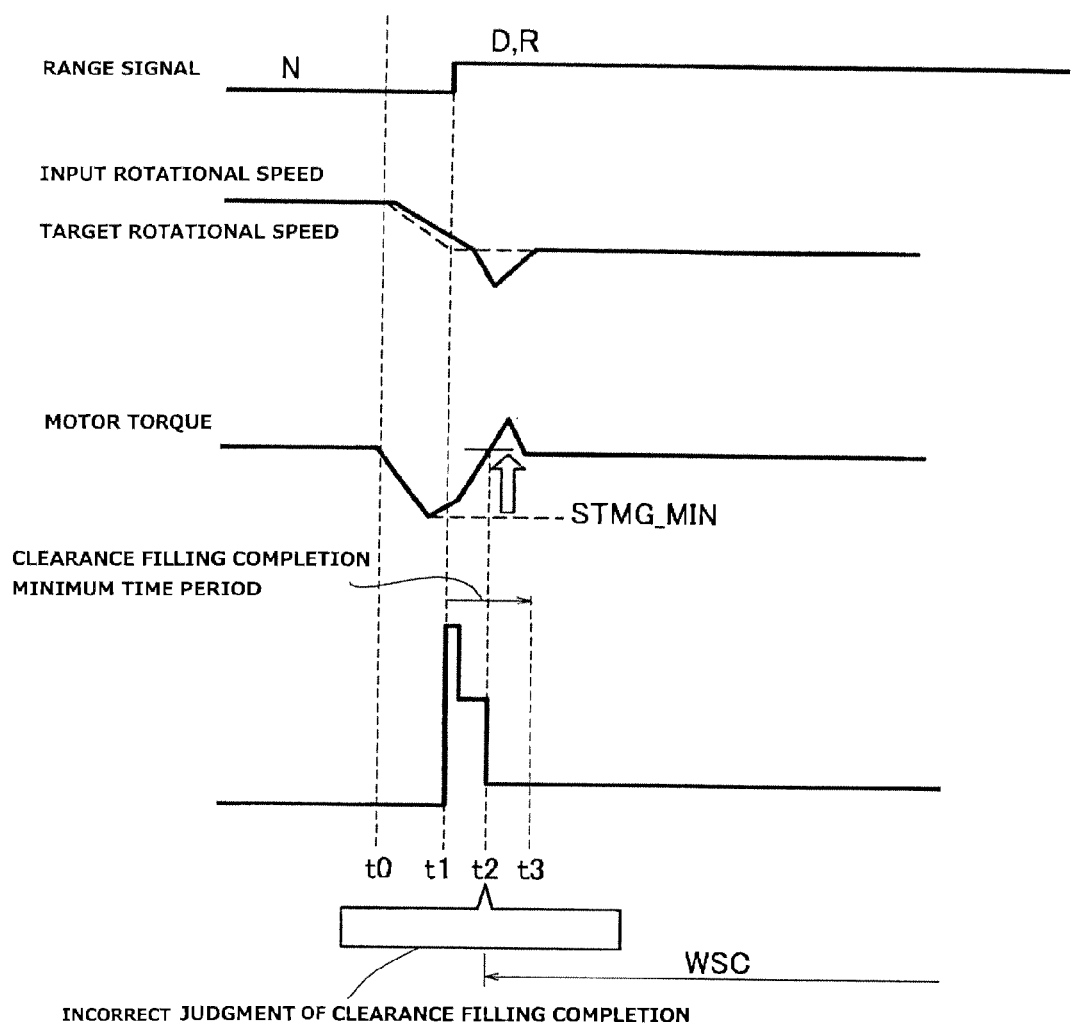
FIG. 12 is a time chart showing characteristics of a range signal, the input rotational speed, the motor torque, and a command pressure to second brake B2 when N-to-D selecting operation is performed while the rotational speed is decreasing from a high idle rotational speed to a normal idle rotational speed, according to a comparative example.

For example, under the condition of high idle rotational speed when the vehicle is stationary with the N range selected and the engine in cold state, the target idle rotational speed starts to decrease due to promotion of warming-up at a time instant t0 in FIG. 12, and then the engine rotational speed continues to be reduced toward the normal idle rotational speed. At this time, the load of motor generator MG under the motor rotational speed control decreases to promote the decrease of the engine rotational speed. When the motor rotational speed control is shifted to a control for keeping a constant target rotational speed in response to N-to-D selecting operation at a time instant t1 under this condition, the load of motor generator MG rapidly increases from the reduced state, for suppressing the engine rotational speed from decreasing. Accordingly, at a time instant t2 immediately after the N-to-D selecting operation, the motor torque change amount becomes greater than or equal to the threshold value, thereby causing an incorrect judgment (incorrect judgment of clearance filling completion) that it results from engagement start of the second clutch.

After time instant t2, the WSC mode control is started based on slip-engagement which absorbs the differential rotation between the engine Eng and left and right rear wheels RL, RR while controlling the engagement capacity for obtaining a transmitted torque according to the requested driving torque. Namely, after time instant t2, when the vehicle is stationary with the brake ON, the requested driving torque is equal to zero, so that the command value is controlled to decrease gradually in order to force the torque transmitted through second brake B2 to be very small. Under this condition, a time lag or a shock occurs to make the driver uncomfortable, because the engagement start of second brake B2 is incorrectly judged although engagement of second brake B2 is not started. Namely, when the driver requests a vehicle start with operation of the brake OFF and the accelerator ON, the engagement torque capacity of second brake B2 fails to rise in response to rise of the hydraulic pressure, thereby causing a shock due to a time lag to a torque buildup or due to a rapid engagement.

The following describes the behavior of the first embodiment when a selecting operation is performed from the N range to the D range (or R range) while the idle rotational speed is decreasing from the high idle rotational speed to the normal idle rotational speed, in contrast to the comparative example. At a time instant t1 when the selecting operation from the N range to the D range is performed as shown by the characteristic of command pressure in FIG. 13, the command pressure is set maximized by kick charging during a period from time instant t1 to a time instant t2. Then, during a period from time instant t2 to a time instant t3, the command pressure is set slightly lower by pre-charging than the maximum command pressure, and then is reduced at time instant t3, and is then set to increase gradually from the reduced command pressure.

However, during a period from time instant t1 to time instant t3, the clearance filling completion minimum time period (namely, the time period when the torque and rotational speed fluctuate due to disturbance, or the longer one of the clearance filling judgment calculation inhibition time period at Step S6 and the piston stroke control minimum time period at Step S9) has not elapsed until a time instant t4, so that the engagement start judgment for second brake B2 is not started. Namely, the judgment about engagement start of second brake B2 is started after awaiting a lapse of an engagement start judgment inhibition time period, wherein the engagement start judgment inhibition time period is defined as a time period to time instant t4 when it becomes possible to judge convergence of the rotational fluctuation of engine Eng and motor generator MG caused by an external factor (fluctuation of idle rotational speed) other than engagement start of second brake B2. This serves to prevent incorrect judgment of engagement start of second brake B2 even when the motor torque change amount becomes large from time instant t1 to time instant t4, in contrast to the comparative example.

After time instant t4, when the characteristic of the motor torque becomes stable due to convergence of engine Eng and motor generator MG, the engagement start judgment for second brake B2 is started. Namely, at a time instant t5, when the motor torque change amount becomes greater than or equal to the motor torque change amount threshold value, it is judged that engagement of second brake B2 has been started (the clearance filling of second brake B2 is judged to have been completed). The engagement start judgment of second brake B2 is started after awaiting a lapse of the engagement start judgment inhibition time period, wherein the time period from time instant t1 to time instant t4 is set as the engagement start judgment inhibition time period, as described above, so that the engagement start of second brake B2 is judged accurately.

After time instant t5, the WSC mode control is started based on slip-engagement which absorbs the differential rotation between the engine Eng and left and right rear wheels RL, RR while controlling the engagement capacity for obtaining a transmitted torque according to the requested driving torque. Namely, after time instant t5, when the vehicle is stationary with the brake ON, the requested driving torque is equal to zero, so that the command value is controlled to decrease gradually until a time instant t6 in order to force the torque transmitted through second brake B2 to be very small. Under this condition, by the accurate judgment of engagement start of second brake B2, the hydraulic pressure is controlled to a standby hydraulic pressure that is greater than or equal to a hydraulic pressure allowing the controlled piston of second brake B2 to be held under the condition of stroke completion, and is lower than or equal to a hydraulic pressure preventing the endurance of second brake B2 from falling significantly due to slipping.

This prevents that a time lag or a shock makes the driver uncomfortable as in the case where the engagement start of second brake B2 is incorrectly judged although engagement of second brake B2 is not started. Namely, after time instant t6, for example, if the command pressure is raised according to rise of the requested driving torque when the driver performs accelerator ON operation after brake OFF operation to request a vehicle start, the engagement torque capacity of second brake B2 rises in quick response, thereby preventing the occurrence of a shock due to a time lag to a torque buildup or due to a rapid engagement.

On the other hand, it prevents the endurance and reliability of second brake B2 from being adversely affected as in the case where the engagement start of second brake B2 is incorrectly judged although engagement of second brake B2 has been already started. Namely, after time instant t6, for example, when the driver maintains the brake ON condition, the condition of slip-engagement is continued by the standby hydraulic pressure which causes no plate seizing of second brake B2, where a frictional heat is suppressed from occurring.

Accordingly, at the time of N-to-D selecting operation under the condition that the idle rotational speed is decreasing from the high idle rotational speed, the accurate judgment of engagement start of second brake B2 (namely, judgment about clearance filling) serves to enhance the controllability in the WSC mode control after the judgment of engagement start.

The following describes effects obtained by the control apparatus for the FR hybrid vehicle according to the first embodiment.

(1) The hybrid vehicle control apparatus includes: a drive source including an engine Eng and a motor (motor generator MG); a friction engagement element (second brake B2) provided in a driving force transmission path from the drive source (engine Eng) to a driving wheel (left and right rear wheels RL, RR), wherein the friction engagement element is engaged when a drive range (D range or the like) is selected; an input rotational speed keeping control means (Step S3 in FIG. 6) that performs, by a rotational speed control of the motor (motor generator MG), a control for keeping an input rotational speed of the friction engagement element (second brake B2) at a target rotational speed that is equal to the input rotational speed at start of an engagement control of the friction engagement element; and an engagement start judgment means (FIG. 6) that judges, in response to a condition, that the friction engagement element (second brake B2) has started to be engaged, wherein the condition is a condition that a parameter (input rotational speed change rate, motor torque change amount, etc.) has exceeded or become equal to a predetermined threshold value when in a start region of the engagement control of the friction engagement element (second brake B2), wherein the parameter changes along with a rotational fluctuation of the drive source (engine Eng, motor generator MG); wherein the engagement start judgment means (FIG. 6) starts the judgment after awaiting a condition that it becomes possible to judge convergence of a rotational fluctuation of the drive source (engine Eng, motor generator MG) caused by an external factor other than engagement start of the friction engagement element (second brake B2) after the time of start of engagement start control of the friction engagement element (second brake B2) (YES at Step S9). This serves to prevent incorrect judgment of engagement start of the friction engagement element (second brake B2), when the drive source (engine Eng, motor generator MG) fluctuates rotationally due to an external factor other than engagement start of the friction engagement element (second brake B2).

(2) The engagement start judgment means (FIG. 6) employs as the parameter a motor torque change amount that is an amount of change of a load of the motor (motor generator MG) that changes according to the input rotational speed keeping control (Step S11). This serves to prevent incorrect judgment about engagement start when the N-to-D selecting operation is performed while the idle rotational speed is decreasing from the high idle rotational speed, and serves to judge the engagement start of the friction engagement element (second brake B2) accurately based on the motor torque change amount as the parameter, in addition to the effect (1).

(3) The engagement start judgment means (FIG. 6) employs as the parameter an input rotational speed change rate that is a rate of change of a rotational speed of an input shaft of the friction engagement element (second brake B2), wherein the input rotational speed change rate changes along with the rotational fluctuation of the drive source (engine Eng, motor generator MG) (Step S10). This serves to prevent incorrect judgment about engagement start when the N-to-D selecting operation is performed while the idle rotational speed is decreasing from the high idle rotational speed, and serves to judge the engagement start of the friction engagement element (second brake B2) accurately based on the input rotational speed change rate as the parameter, in addition to the effect (1).

(4) The engagement start judgment means (FIG. 6) employs as the parameters both of a motor torque change amount that is an amount of change of a load of the motor (motor generator MG) that changes according to the input rotational speed keeping control, and an input rotational speed change rate that is a rate of change of a rotational speed of an input shaft of the friction engagement element (second brake B2), wherein the input rotational speed change rate changes along with the rotational fluctuation of the drive source (engine Eng, motor generator MG) (Step S10, Step S11). This serves to prevent incorrect judgment about engagement start when the N-to-D selecting operation is performed while the idle rotational speed is decreasing from the high idle rotational speed, and serves to judge the engagement start of the friction engagement element (second brake B2) further accurately based on both of the motor torque change amount and the input rotational speed change rate as the parameter, in addition to the effect (1).

(5) The engagement start judgment means (FIG. 6) sets an absolute value of the predetermined threshold value larger when it is possible to judge that the rotational fluctuation of the drive source (engine Eng, motor generator MG) is large than when it is possible to judge that the rotational fluctuation of the drive source is small (Step S10, Step S11). This serves to prevent incorrect judgment about engagement start when the N-to-D selecting operation is performed under the condition of high idle rotational speed, and serves to judge the engagement start of the friction engagement element (second brake B2) accurately, in addition to the effects (1) to (4).

(6) The friction engagement element (second brake B2) is a starting element, wherein the engagement control of the friction engagement element (second brake B2) is started in response to a selecting operation of an automatic transmission from a non-drive range (N range) to a drive range (D range); and the vehicle control apparatus includes a slip engagement control means (WSC mode control means) that starts a slip engagement control for absorbing a differential rotation between the drive source (engine Eng, motor generator MG) and the driving wheel (left and right rear wheels RL, RR) with performing an engagement capacity control for obtaining a transmitted torque according to a requested driving torque, in response to the judgment by the engagement start judgment means (FIG. 6) that the friction engagement element (second brake B2) has started to be engaged. This serves to enhance the controllability in the WSC mode control after the judgment of engagement start, by accurate judgment about engagement start of the friction engagement element (second brake B2), when N-to-D selecting operation is performed, in addition to the effects (1) to (5).

Although the hybrid vehicle control apparatus according to the present invention is described with reference to the first embodiment, specific configuration is not limited to the first embodiment, but may be applied with design modification or design addition unless going beyond the subject matter of the present invention defined by the claims.

In the first embodiment, the example is shown in which the present control is adopted regardless of whether or not it is while the idle rotational speed is changing that a selecting operation is performed. However, the timing of clearing filling judgment may be configured to be delayed only when a selecting operation is performed while the idle rotational speed is changing.

In the first embodiment, the condition convergence of the rotational fluctuation of the drive source is identified by the timer indicating a lapse of the predetermined time period until the condition that it is possible to judge convergence of the rotational fluctuation of the drive source. However, the judgment of convergence of the rotational fluctuation of the drive source may be based on a condition where the difference between the target rotational speed and actual rotational speed of the input shaft has converged within a predetermined range, or a condition where the rate of change of the actual input rotational speed changes from the negative side to the positive side, or a condition where the rate of change of the motor torque changes from the negative side to the positive side.

In the first embodiment, the condition where it is possible to judge the rotational fluctuation of the drive source to be large is implemented by an example of condition that the rotational speed of the transmission input shaft is high. However, the condition where it is possible to judge the rotational fluctuation of the drive source to be large may be implemented by an example of condition that the engine coolant temperature is low wherein the absolute value of the threshold value is set to increase as the engine coolant temperature decreases.

In the first embodiment, the example of control at the time of N-to-D selecting operation is shown. However, the invention is applicable to N-to-R selecting operation, and quick selecting operation during D-to-R selecting operation or R-to-D selecting operation. The invention is not limited to the selecting operation condition, but may be applied to a system in which clearance filling of a friction engagement element is judged wherein the friction engagement element is engaged during a gearshift or the like.

In the first embodiment, with regard to the input rotational speed change rate and the motor torque change amount, the example is shown in which the absolute value of the input rotational speed change rate threshold value and the absolute value of the motor torque change amount threshold value are set to increase as the input rotational speed increases. However, the absolute value of only one of the input rotational speed change rate threshold value and the motor torque change amount threshold value may be set to increase as the input rotational speed increases. Moreover, also with regard to the threshold values of the input rotational speed change amount and the input rotational speed, the absolute value of the threshold value may be set to increase as the input rotational speed increases.

In the first embodiment, the example is shown in which the hybrid vehicle control apparatus of the present invention is applied to the FR hybrid vehicle. However, the hybrid vehicle control apparatus of the present invention may be applied to an FF hybrid vehicle or 4WD hybrid vehicle. In summary, it is applicable to any vehicle in which a drive source includes an engine and a motor, and includes a friction engagement element in a driving force transmission path.

The following describes a second embodiment of the present invention. Description common to the first embodiment described above is omitted, and a part different from the first embodiment is described mainly. In the hybrid vehicle of the second embodiment, auxiliary oil pump S-O/P is removed from the configuration of the first embodiment shown in FIG. 1, in order to simplify the configuration by reduction of the number of parts. Since the configuration does not include auxiliary oil pump S-O/P, main oil pump M-O/P is rotated by a rotational speed control of motor generator MG, to ensure the hydraulic pressure supplied to automatic transmission AT, under the condition that first clutch CL1 (second friction engagement element) is disengaged (for example, not in a state of warming-up operation), wherein first clutch CL1 is provided in the power transmission path between engine Eng and motor generator MG. On the other hand, also in the case of the configuration without auxiliary oil pump S-O/P, when the SOC of battery 4 is at low level under the condition that the vehicle is stationary, the electric power generation mode is selected in which first clutch CL1 is engaged and electric power generation is performed by using the driving force of engine Eng.

As an idle rotational speed control for keeping the transmission input rotational speed at a predetermined target idle rotational speed when in idle operation, a motor idling operation is performed by a rotational speed control of motor generator MG when first clutch CL1 is disengaged, whereas an engine idling operation is performed by a rotational speed control of engine Eng (or motor generator MG) when first clutch CL1 is engaged. Since the controllability of motor generator MG is better than that of engine Eng, the rotational fluctuation is smaller under the condition of motor idling operation than under the condition of engine idling operation. Namely, when first clutch CL1 is engaged, the input from engine Eng behaves as a disturbance to the rotational fluctuation, so that the rotational fluctuation becomes larger than when first clutch CL1 is disengaged.

Figure 13:
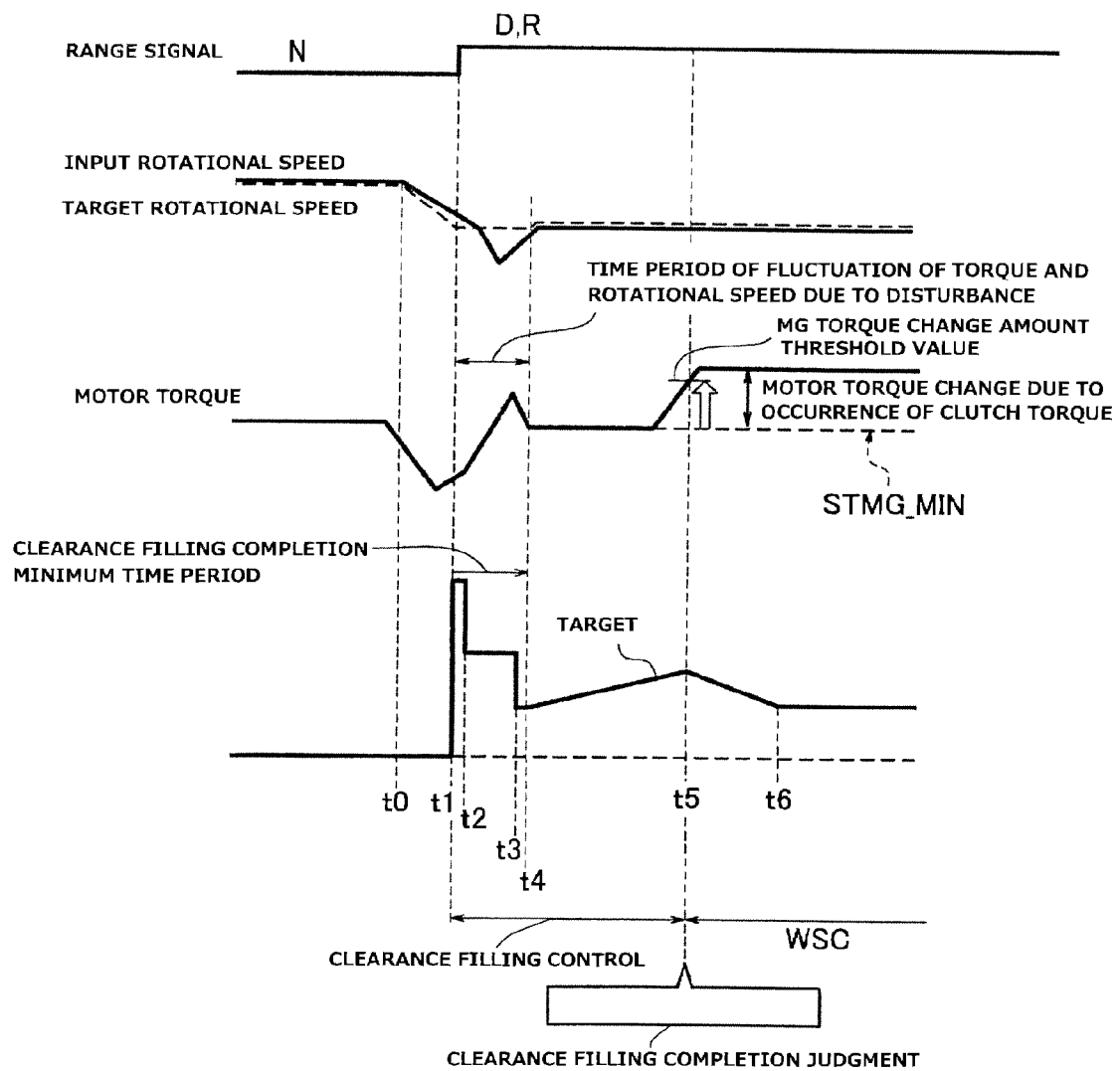
FIG. 13 is a time chart showing characteristics of a range signal, the input rotational speed, the motor torque, and a command pressure to second brake B2 when N-to-D selecting operation is performed while the rotational speed is decreasing from a high idle rotational speed to a normal idle rotational speed, according to the first embodiment.

Accordingly, in the second embodiment, the predetermined time period is set according to states of engagement of first clutch CL1, wherein the predetermined time period is a time period from the time of start of engagement control of second brake B2 as a friction engagement element to the time when it becomes possible to judge convergence of the rotational fluctuation of the drive source due to the external factor other than engagement start of second brake B2. This predetermined time period corresponds to the clearance filling completion minimum time period in FIG. 13, namely, the longer one of the clearance filling judgment calculation inhibition time period at Step S6 and the piston stroke control minimum time period at Step S9. Specifically, in the second embodiment, under the condition of engine idling operation, namely, when first clutch CL1 is engaged, the clearance filling judgment calculation inhibition time period at Step S6 (or the piston stroke control minimum time period at Step S9) is set longer, and thereby the clearance filling completion minimum time period in FIG. 13 is set longer, based on judgment that the rotational fluctuation is large, than under the condition of motor idling operation, namely, when first clutch CL1 is disengaged.

FIG. 14 is a flow chart showing a flow of setting a clearance filling judgment calculation inhibition time period (clearance filling completion minimum time period in FIG. 13) according to the second embodiment. At Step S21, it is judged whether or not first clutch CL1 is engaged. When first clutch CL1 is engaged, namely, under the condition of engine idling operation, the process proceeds to Step S22 where the clearance filling judgment calculation inhibition time period is set longer than when first clutch CL1 is disengaged. Specifically, at Step S22, the clearance filling judgment calculation inhibition time period (clearance filling completion minimum time period) is set to a value which is found by a table for the condition that first clutch CL1 is engaged, which is shown by a solid line in FIG. 15A. On the other hand, when first clutch CL1 is disengaged, namely, under the condition of motor idling operation, the process proceeds from Step S21 to Step S23 where the clearance filling judgment calculation inhibition time period is set shorter than when first clutch CL1 is engaged. Specifically, at Step S23, the clearance filling judgment calculation inhibition time period (clearance filling completion minimum time period) is set to a value which is found by a table for the condition that first clutch CL1 is disengaged, which is shown by a dotted line in FIG. 15A.

In this way, in the second embodiment, when first clutch CL1 is engaged so that the rotational fluctuation is large due to disturbances from the engine side such as engine torque fluctuation, inertia, friction, etc., the setting of the long clearance filling completion minimum time period serves to suppress or prevent incorrect judgment about engagement start of the friction engagement element (second brake B2) due to the disturbances, and when first clutch CL1 is disengaged so that the rotational fluctuation is small, the setting of the short clearance filling completion minimum time period serves to perform the engagement start judgment quickly.

Moreover, in the second embodiment, the clearance filling completion minimum time period is set depending on the engine coolant temperature or engine oil temperature. Specifically, as shown in FIG. 15B, when first clutch CL1 is engaged, the clearance filling judgment calculation inhibition time period is longer when engine coolant temperature or engine oil temperature is low than when engine coolant temperature or engine oil temperature is high, namely, the clearance filling completion minimum time period is set to increase as the engine coolant temperature or engine oil temperature decreases.

When the engine coolant temperature or engine oil temperature is low, fluctuation of the engine friction and torque is large so that the controllability of the rotational control by motor generator MG is degraded. However, in the second embodiment, the feature that the clearance filling completion minimum time period is set long when the engine coolant temperature or engine oil temperature is low, serves to suppress or prevent incorrect judgment about engagement start due to the degradation of the controllability of the rotational control.

Moreover, in the second embodiment, as shown in FIG. 15C, the clearance filling completion minimum time period is set depending on the temperature of working fluid for control of automatic transmission AT. Specifically, when the temperature of working fluid for control of automatic transmission AT is low, the clearance filling completion minimum time period is set longer than when the temperature of working fluid for control of automatic transmission AT is high, namely, the clearance filling completion minimum time period is set to increase as the temperature decreases. When the temperature of working fluid for control of automatic transmission AT is low, the friction of automatic transmission AT is large so that the controllability of the rotational control by motor generator MG is degraded. However, the feature that the clearance filling completion minimum time period is set long when the temperature of working fluid for control of automatic transmission AT is low, serves to suppress or prevent incorrect judgment about engagement start due to the degradation of the controllability of the rotational control.

Moreover, in the second embodiment, although not shown in the drawings, the clearance filling completion minimum time period is set depending on the rate of change of the target rotational speed immediately before the selection of the drive range. Specifically, when this rate of change of the target rotational speed is large, the clearance filling completion minimum time period is set longer than when this rate of change of the target rotational speed is small.

Although the fluctuation of the motor torque is large when the rate of change of the target rotational speed is large, the feature that the clearance filling completion minimum time period is set long under this condition, serves to suppress or prevent incorrect judgment about engagement start due to the fluctuation of the motor torque.

The automatic transmission is not limited to stepwise transmissions as in the first embodiment and the second embodiment described above, but may be a continuously variable transmission (CVT).

The invention claimed is:
1. A hybrid vehicle control apparatus comprising:
a drive source including an engine and a motor;
a friction engagement element provided in a driving force transmission path from the drive source to a driving wheel, wherein the friction engagement element is engaged when a drive range is selected;
an input rotational speed keeping control section that performs, by a rotational speed control of the motor, a control for keeping an input rotational speed of the friction engagement element at a target rotational speed that is equal to the input rotational speed at start of an engagement control of the friction engagement element; and
an engagement start judgment section that judges, in response to a condition, that the friction engagement element has started to be engaged, wherein the condition is a condition that a parameter has exceeded or become equal to a predetermined threshold value when in a start region of the engagement control of the friction engagement element, wherein the parameter changes along with a rotational fluctuation of the drive source;
wherein the engagement start judgment section starts the judgment after awaiting satisfaction of a predetermined condition after the start of the engagement control of the friction engagement element.
2. The hybrid vehicle control apparatus as claimed in claim 1, wherein the engagement start judgment section employs as the parameter a motor torque change amount that is an amount of change of a load of the motor that changes according to the input rotational speed keeping control.

3. The hybrid vehicle control apparatus as claimed in claim 1, wherein the engagement start judgment section employs as the parameter an input rotational speed change rate that is a rate of change of a rotational speed of an input shaft of the friction engagement element, wherein the input rotational speed change rate changes along with the rotational fluctuation of the drive source.

4. The hybrid vehicle control apparatus as claimed in claim 1, wherein the engagement start judgment section employs as the parameters both of a motor torque change amount that is an amount of change of a load of the motor that changes according to the input rotational speed keeping control, and an input rotational speed change rate that is a rate of change of a rotational speed of an input shaft of the friction engagement element, wherein the input rotational speed change rate changes along with the rotational fluctuation of the drive source.

5. The hybrid vehicle control apparatus as claimed in claim 1, wherein the engagement start judgment section sets an absolute value of the predetermined threshold value larger when it is possible to judge that the rotational fluctuation of the drive source is large than when it is possible to judge that the rotational fluctuation of the drive source is small.

6. The hybrid vehicle control apparatus as claimed in claim 1, wherein:
the friction engagement element is a starting element, wherein the engagement control of the friction engagement element is started in response to a selecting operation of an automatic transmission from a non-drive range to a drive range; and
the hybrid vehicle control apparatus includes a slip engagement control section that starts a slip engagement control for absorbing a differential rotation between the drive source and the driving wheel with performing an engagement capacity control for obtaining a transmitted torque according to a requested driving torque, in response to the judgment by the engagement start judgment section that the friction engagement element has started to be engaged.

7. The hybrid vehicle control apparatus as claimed in claim 1, wherein the engagement start judgment section starts the judgment after awaiting a lapse of a predetermined time period after the start of the engagement control of the friction engagement element.

8. The hybrid vehicle control apparatus as claimed in claim 7, wherein:
a second friction engagement element is provided in a driving force transmission path between the engine and the motor; and
the predetermined time period is set longer when the second friction engagement element is engaged than when the second friction engagement element is disengaged.

9. The hybrid vehicle control apparatus as claimed in claim 7, wherein the predetermined time period is set longer when temperature of working oil for automatic transmission control is low than when the temperature of the working oil is high.

10. The hybrid vehicle control apparatus as claimed in claim 7, wherein the predetermined time period is set longer when coolant temperature or oil temperature of the engine is low than when the coolant temperature or oil temperature of the engine is high.

11. The hybrid vehicle control apparatus as claimed in claim 7, wherein the predetermined time period is set longer when a rate of change of a target motor rotational speed immediately before selection of the drive range is large than when the rate of change of the target motor rotational speed immediately before selection of the drive range is small.

* * * * *